United States Patent
Meylan et al.

(10) Patent No.: US 9,629,028 B2
(45) Date of Patent: Apr. 18, 2017

(54) SYSTEM AND METHOD FOR HETEROGENEOUS CARRIER AGGREGATION

(71) Applicant: QUALCOMM Incorporated, San Diego, CA (US)

(72) Inventors: Arnaud Meylan, San Diego, CA (US); Miguel Griot, San Diego, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 667 days.

(21) Appl. No.: 13/773,020

(22) Filed: Feb. 21, 2013

(65) Prior Publication Data

US 2013/0242897 A1   Sep. 19, 2013

Related U.S. Application Data

(60) Provisional application No. 61/612,127, filed on Mar. 16, 2012.

(51) Int. Cl.
*H04W 4/00* (2009.01)
*H04W 28/16* (2009.01)
(Continued)

(52) U.S. Cl.
CPC ............ *H04W 28/16* (2013.01); *H04L 5/001* (2013.01); *H04W 80/04* (2013.01); *H04L 5/0053* (2013.01); *H04W 84/12* (2013.01)

(58) Field of Classification Search
CPC ..... H04L 5/0007; H04L 5/001; H04L 5/0053; H04L 27/32; H04L 29/06; H04L 29/08;
(Continued)

(56) References Cited

U.S. PATENT DOCUMENTS 7,720,098 B1 * 5/2010 Allen .................... H04W 28/20
                                                  370/464
8,019,296 B1   9/2011 Durig
(Continued)

FOREIGN PATENT DOCUMENTS

CN    1954626 A    4/2007
EP    2563088 A1   2/2013
(Continued)

OTHER PUBLICATIONS

Taiwan Search Report—TW102106533—TIPO—Mar. 16, 2015.
(Continued)

*Primary Examiner* — Alpus H Hsu
(74) *Attorney, Agent, or Firm* — Harrity & Harrity, LLP

(57) ABSTRACT

Techniques for aggregating heterogeneous carriers in a wireless communication system are disclosed. A mobile device may receive a configuration for aggregating a plurality of component carriers including one or more cellular carriers and a wireless local area network (WLAN) carrier. The one or more cellular carriers may include LTE carriers, and aggregation may be performed at a sub-IP protocol layer of operation. In one aspect, protocol entities may be modified to perform quality of service determinations, carrier selection, traffic mapping, or the like, in view of the different capabilities and characteristics of the heterogeneous carriers in the carrier aggregation configuration.

83 Claims, 26 Drawing Sheets

(51) Int. Cl.
*H04W 72/04* (2009.01)
*H04W 80/04* (2009.01)
*H04W 84/12* (2009.01)
*H04L 5/00* (2006.01)

(58) Field of Classification Search
CPC ..... H04L 41/0803; H04L 47/14; H04L 63/16; H04W 28/0273; H04W 28/10; H04W 28/16; H04W 28/18; H04W 72/04; H04W 72/1263; H04W 84/02; H04W 84/12; H04W 84/18; H04W 88/06; H04W 92/02
See application file for complete search history.

(56) References Cited

U.S. PATENT DOCUMENTS

| | | | | |
|---|---|---|---|---|
| 8,036,702 | B2* | 10/2011 | Etemad | 455/553.1 |
| 8,095,129 | B2 | 1/2012 | Adams et al. | |
| 8,175,047 | B2* | 5/2012 | Seok | H04W 28/06 370/329 |
| 8,194,603 | B2* | 6/2012 | Nimbalker et al. | 370/329 |
| 8,265,038 | B2 | 9/2012 | Kezys et al. | |
| 8,320,325 | B2* | 11/2012 | Xue et al. | 370/330 |
| 8,442,024 | B2 | 5/2013 | Montemurro et al. | |
| 8,498,666 | B2* | 7/2013 | Sebire | H04L 5/001 370/351 |
| 8,514,779 | B2* | 8/2013 | Ozturk | H04L 1/0017 370/328 |
| 8,560,009 | B2* | 10/2013 | Etemad | 455/553.1 |
| 8,605,674 | B2* | 12/2013 | Park | H04L 1/08 370/329 |
| 8,670,432 | B2* | 3/2014 | Luo | 370/345 |
| 8,687,545 | B2* | 4/2014 | Damnjanovic et al. | 370/328 |
| 8,717,920 | B2* | 5/2014 | Larsson et al. | 370/252 |
| 8,761,047 | B2* | 6/2014 | Kim | H04W 76/066 370/252 |
| 8,817,623 | B2* | 8/2014 | Gupta | H04W 4/005 370/235 |
| 8,817,644 | B2* | 8/2014 | Etemad | H04B 7/024 370/252 |
| 8,824,298 | B2* | 9/2014 | Gupta | H04W 4/005 370/235 |
| 8,848,513 | B2 | 9/2014 | Das et al. | |
| 8,954,106 | B2* | 2/2015 | Kim | H04W 52/365 370/252 |
| 9,008,067 | B2* | 4/2015 | Yi | H04W 52/54 370/341 |
| 9,019,848 | B2* | 4/2015 | Chun | H04W 72/087 370/252 |
| 9,036,473 | B2* | 5/2015 | Himayat | H04N 21/2365 370/231 |
| 9,042,320 | B2* | 5/2015 | Kim | H04L 5/0007 370/229 |
| 9,119,154 | B2* | 8/2015 | Etemad | H04B 7/2656 |
| 9,125,012 | B2* | 9/2015 | Pelletier | H04W 4/02 |
| 2005/0153692 | A1 | 7/2005 | Hwang et al. | |
| 2006/0092963 | A1* | 5/2006 | Bakre | H04L 12/5695 370/437 |
| 2007/0140163 | A1 | 6/2007 | Meier et al. | |
| 2007/0230401 | A1 | 10/2007 | Rayzman et al. | |
| 2008/0049694 | A1 | 2/2008 | Kinoshita et al. | |
| 2008/0316970 | A1 | 12/2008 | Choi | |
| 2009/0042601 | A1 | 2/2009 | Wang et al. | |
| 2009/0129354 | A1 | 5/2009 | Gupta et al. | |
| 2009/0296683 | A1* | 12/2009 | Raju | H04L 69/324 370/349 |
| 2010/0067433 | A1 | 3/2010 | Cheng et al. | |
| 2010/0103914 | A1* | 4/2010 | Tsao | H04L 69/32 370/338 |
| 2010/0150082 | A1* | 6/2010 | Shin | H04W 72/1284 370/329 |
| 2011/0188376 | A1 | 8/2011 | Stupar et al. | |
| 2011/0205946 | A1 | 8/2011 | Avital et al. | |
| 2011/0222523 | A1 | 9/2011 | Fu et al. | |
| 2011/0267977 | A1 | 11/2011 | Doppler et al. | |
| 2011/0305220 | A1 | 12/2011 | Lindoff et al. | |
| 2012/0218963 | A1* | 8/2012 | Kim | H04L 1/1861 370/329 |
| 2012/0230191 | A1 | 9/2012 | Fang | |
| 2012/0238287 | A1 | 9/2012 | Scherzer | |
| 2012/0252460 | A1 | 10/2012 | Koskinen et al. | |
| 2012/0257598 | A1 | 10/2012 | Karampatsis et al. | |
| 2012/0263145 | A1 | 10/2012 | Marinier et al. | |
| 2013/0051264 | A1* | 2/2013 | Wang et al. | 370/252 |
| 2013/0064190 | A1* | 3/2013 | Hariharan et al. | 370/329 |
| 2013/0064191 | A1* | 3/2013 | Jeong et al. | 370/329 |
| 2013/0083661 | A1* | 4/2013 | Gupta | H04W 4/005 370/235 |
| 2013/0095831 | A1 | 4/2013 | Lee et al. | |
| 2013/0121325 | A1 | 5/2013 | McCann et al. | |
| 2013/0142113 | A1* | 6/2013 | Fong et al. | 370/328 |
| 2013/0242783 | A1 | 9/2013 | Horn et al. | |
| 2013/0242965 | A1 | 9/2013 | Horn et al. | |
| 2014/0016588 | A1* | 1/2014 | Garcia et al. | 370/329 |
| 2014/0043979 | A1* | 2/2014 | Etemad et al. | 370/237 |
| 2014/0050086 | A1 | 2/2014 | Himayat et al. | |
| 2014/0112282 | A1* | 4/2014 | Wijting et al. | 370/329 |
| 2014/0161026 | A1 | 6/2014 | Stojanovski et al. | |
| 2014/0241265 | A1* | 8/2014 | Pragada et al. | 370/329 |
| 2014/0335878 | A1* | 11/2014 | Uzeda Garcia et al. | 455/452.1 |
| 2014/0369198 | A1* | 12/2014 | Rinne | H04W 40/02 370/235 |
| 2014/0369322 | A1* | 12/2014 | Fwu et al. | 370/336 |

FOREIGN PATENT DOCUMENTS

| | | |
|---|---|---|
| TW | 201210371 A | 3/2012 |
| WO | 2009021009 A1 | 2/2009 |
| WO | 2011028954 A1 | 3/2011 |
| WO | 2011087223 A2 | 7/2011 |
| WO | 2012121757 A1 | 9/2012 |
| WO | 2012148482 A1 | 11/2012 |
| WO | 2012149954 A1 | 11/2012 |
| WO | 2012168535 A1 | 12/2012 |

OTHER PUBLICATIONS

Doppler K et al., "Concurrent Bandwidth Aggregation over Wireless Networks" Computing, Networking and Communications (ICNC), 2012 International Conference on, IEEE, Jan. 20, 2012 (Jan. 30, 2012), pp. 604-610, XP032130748, DOI: 10.1109/ICCNC.2012.6167494, ISBN: 978-1-4673-0008-7.
International Search Report and Written Opinion—PCT/US2013/027319—ISA/EPO—Jul. 25, 2013.
"3rd Generation Partnership Project; Technical Specification Group Services and System Aspects; IP flow mobility and seamless Wireless Local Area Network (WLAN) offload; Stage 2 (Release 10)", 3GPP Standard; 3GPP TS 23.261, 3rd Generation Partnership Project (3GPP), Mobile Competence Centre; 650, Route Des Lucioles; F-06921 Sophia-Antipolis Cedex; France, vol. SA WG2, No. V10.2.0, Mar. 8, 2012 (Mar. 8, 2012), pp. 1-22, XP050555341, [retrieved on Mar. 8, 2012] paragraphs [0004], [0005].
Toskala A., et al., LTE for UMTS: Evolution to LTE-Advanced, Second Edition, Mar. 4, 2011, Chapter 6, p. 153.

* cited by examiner

SYSTEM AND METHOD FOR HETEROGENEOUS CARRIER AGGREGATION

CROSS-REFERENCE TO RELATED APPLICATION

The present application for patent claims priority to the Provisional Application No. 61/612,127, filed Mar. 16, 2012, entitled "SYSTEM AND METHOD FOR CELLULAR-WLAN CARRIER AGGREGATION", which is assigned to the assignee hereof and hereby expressly incorporated in its entirety by reference herein.

BACKGROUND

Field

Aspects of the present disclosure relate generally to wireless communication systems, and more particularly, to aggregation of heterogeneous carriers below an internet protocol (IP) layer of operation.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of network entities, such as base stations, that can support communication for a number of mobile entities/devices, such as, for example, user equipments (UEs) or access terminals (ATs). A mobile device may communicate with a base station via a downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between a base station, such as an evolved Node B (eNB), and a mobile device, such as a UE.

With increased consumer demand for mobile broadband and Internet access, wireless service providers have implemented cellular carrier aggregation to increase the available bandwidth of WWANs. Such approaches may involve aggregating one or more homogenous cellular carriers as contemplated for LTE networks. However, such carrier aggregation techniques do not address the distinct challenges of aggregating heterogeneous carriers in a wireless communication system.

SUMMARY

Illustrative embodiments of the present invention that are shown in the drawings are summarized below. These and other embodiments are more fully described in the detailed description section. It is to be understood, however, that the invention is not limited to the forms described in this Summary of the Invention or in the detailed description.

In accordance with one or more aspects of the embodiments described herein, there is provided a method for aggregating heterogeneous component carriers, such as, for example, wireless wide area network (e.g., cellular) and wireless local area network (WLAN) carriers. The method may be operable by a mobile device (e.g., a dual WWAN-WLAN capable UE) in wireless communication system. The method may involve receiving a configuration for aggregating a plurality of component carriers comprising at least one WWAN carrier and at least one WLAN carrier, wherein the aggregation is performed at a layer of the mobile device below an internet protocol (IP) layer. Aggregation of the heterogeneous carriers may be performed by MAC-layer or RLC-layer protocol entities. The method may involve determining a mapping of uplink traffic in relation to the at least one cellular carrier and the at least one WLAN carrier. The method may involve sending the uplink traffic based at least in part on the mapping.

In related aspects, the mapping is based on a traffic flow identifier. The traffic flow identifier may be a logical channel identifier (LCID) when the given protocol layer comprises a media access control (MAC) protocol layer. The traffic flow identifier may be a bearer identifier when the given protocol layer comprises a protocol layer above the MAC protocol layer. In further related aspects, an electronic device (e.g., a UE or component(s) thereof) may be configured to execute the above described methodology.

In accordance with one or more aspects of the embodiments described herein, there is provided another method operable by a mobile device. The method may involve receiving a configuration for aggregating a plurality of component carriers comprising at least one cellular carrier and at least one WLAN carrier, wherein the aggregation is performed at a layer of the mobile device below an IP layer. The method may involve determining an association of traffic types with cellular or WLAN carrier types for downlink traffic. The method may involve mirroring the association when sending the uplink traffic in response to the grant. In related aspects, an electronic device (e.g., a UE or component(s) thereof) may be configured to execute the above described methodology.

In accordance with one or more aspects of the embodiments described herein, there is provided a method operable by a network entity. The method may involve sending a configuration to a mobile device for aggregating a plurality of component carriers comprising at least one cellular carrier and at least one WLAN carrier, wherein the aggregation is performed at a layer of the mobile device below an IP layer. The method may involve determining a downlink mapping of downlink traffic in relation to the at least one cellular carrier and the at least one WLAN carrier. The method may involve sending the downlink traffic based at least in part on the downlink mapping.

In related aspects, the method may further involve: determining a mapping of uplink traffic in relation to the at least one cellular carrier and the at least one WLAN carrier; sending to the mobile device, on a configured cellular carrier, a grant for uplink transmission on one of the plurality of component carriers; and receiving the uplink traffic in response to the grant in accordance with the uplink mapping. In yet further related aspects, an electronic device (e.g., an eNB or component(s) thereof) may be configured to execute the above-described methodology.

To the accomplishment of the foregoing and related ends, the one or more embodiments include the features herein-after fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
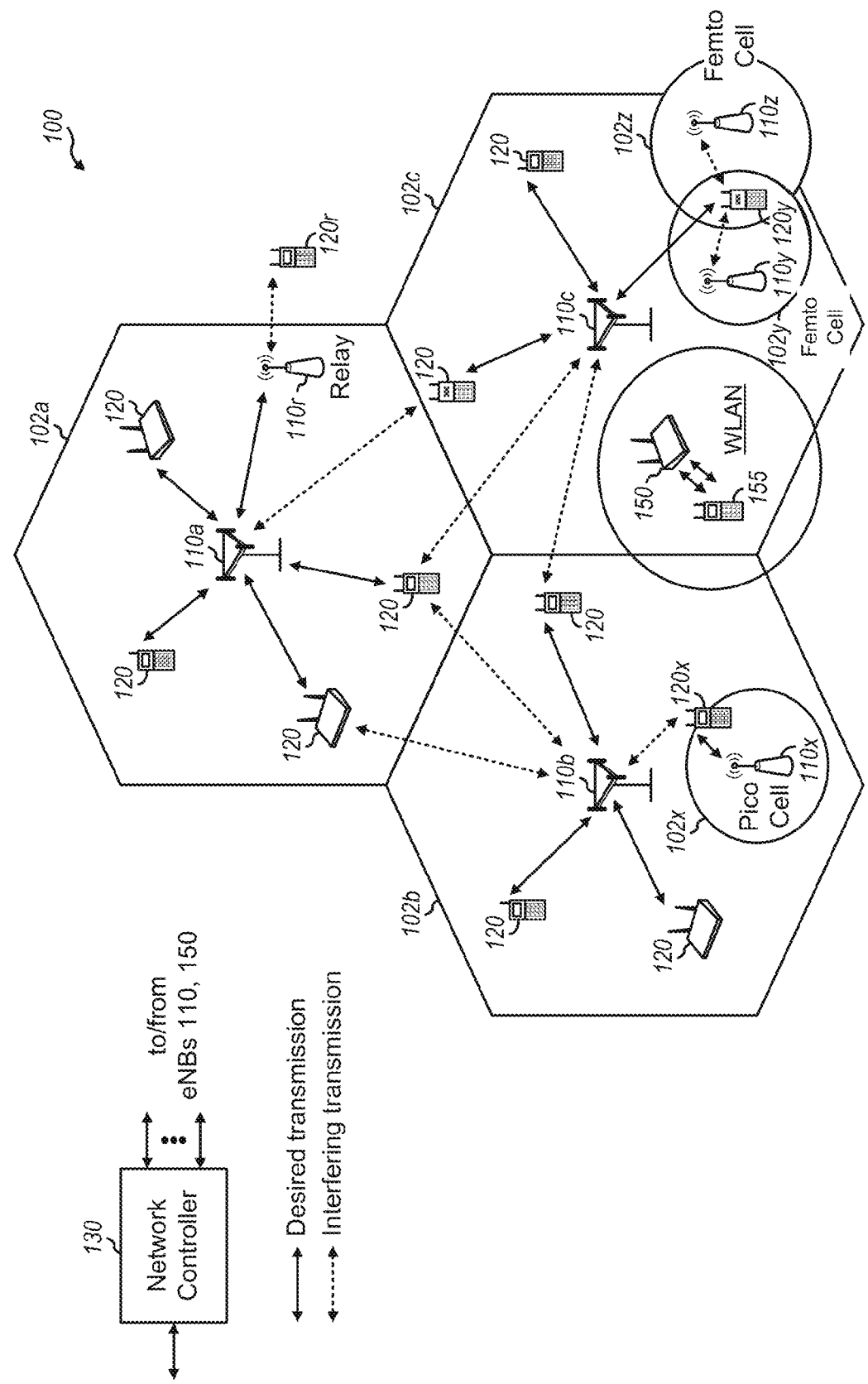
FIG. 1 is a block diagram illustrating an exemplary telecommunications system that includes both a wireless wide area network (WWAN) and wireless local area network (WLAN).

The present disclosure provides techniques for aggregating a plurality of heterogeneous component carriers at a sub-IP protocol layer of operation. The plurality of component carriers may include both cellular and WLAN carriers and various methodologies are provided for addressing dissimilarities between the carrier types. To this end, protocol entities at a MAC-layer and/or RLC-layer of operation may be modified in a wireless communication device to accommodate different capabilities of the aggregated carriers and to support a sub-IP layer mapping of traffic. In various aspects, the mapping may be based on traffic flow identifiers, may reflect policy-based restrictions, may mirror downlink transmissions, may facilitate carrier selection, may be static or dynamic in nature, and/or may change in response to activation/deactivation of the aggregated carriers. FIG. 1 shows a wireless communication network 100, which may be an LTE network, a UMTS network, or the like. It is noted that the wireless network 100 generally includes or refers to a cellular network or wireless wide area network (WWAN), but may also optionally include or otherwise communicate with one or more wireless local area networks (WLANs). The wireless network 100 may include a number of base stations 110 and other network entities. A base station may be a station that communicates with the mobile devices and may also be referred to as an evolved Node B (eNB), a Node B, an access point (AP), or other term. Each base station 110a, 110b, 110c may provide communication coverage for a particular geographic area. In 3GPP, the term "cell" can refer to a coverage area of base station and/or a base station subsystem serving this coverage area, depending on the context in which the term is used.

The wireless network 100 may include relay stations 110r and a network controller 130. A relay station is a station that receives a transmission of data and/or other information from an upstream station (e.g., an base station or a mobile device) and sends a transmission of the data and/or other information to a downstream station (e.g., a mobile device or an base station). A relay station may also be a mobile device that relays transmissions for other mobile devices. As shown in FIG. 1, a relay station 110r may communicate with the base station 110a and mobile device 120r in order to facilitate communication. A network controller 130 may couple to a set of base stations and provide coordination and control and/or access to a core network. In this example, network controller 130 communicate with the base stations 110, 150 via a backhaul. Base stations 110 may also communicate with one another, e.g., directly or indirectly via wireless or wireline backhaul. It is noted that the wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for both synchronous and asynchronous operation.

The wireless network 100 may include different types of cells. A macro cell may cover a relatively large geographic area (e.g., several kilometers in radius) and may allow unrestricted access by mobile devices with service subscription. A pico cell may cover a relatively small geographic area and may allow unrestricted access by mobile devices with service subscription. A femto cell may cover a relatively small geographic area (e.g., a home) and may allow restricted access by mobile devices having association with the femto cell (e.g., mobile devices in a Closed Subscriber Group (CSG), UEs for users in the home, etc.). In the example shown in FIG. 1, the base stations 110a, 110b and 110c may be macro eNBs for the macro cells 102a, 102b and 102c, respectively. The base station 110x may be a pico eNB for a pico cell 102x, serving a mobile device 120x. The base stations 110y and 110z may be femto eNBs for the femto cells 102y and 102z, respectively. A base station may support one or multiple (e.g., three) cells.

It is noted that the mobile devices 120, 155 may be dispersed throughout the wireless network 100. A mobile device may also be referred to as a user equipment (UE), a wireless device, a terminal, a mobile station, a subscriber unit, etc. A mobile device may be a cellular phone, a personal digital assistant (PDA), a wireless modem, a wireless communication device, a handheld device, a laptop computer, a cordless phone, a wireless local loop (WLL) station, or other mobile entities. A mobile device may communicate with macro eNBs, pico eNBs, femto eNBs, relays, or other network entities which form part of wireless network 100.

In related aspects, a mobile device may also communicate with a WLAN AP according to one or more standards, such as the IEEE 802.11 standard, including, for example these amendments: 802.11a-1999 (commonly called "802.11a"), 802.11b-1999 (commonly called "802.11b"), 802.11g-2003 (commonly called "802.11g"), and so on. For instance, in wireless network 100, a dual-capability mobile device 155 and a dual-capability base station 150 are shown within the coverage area of macro cell 110c. The base station 150 may be coupled with elements of the core WWAN network over a backhaul or similar connection. As discussed herein, each dual-capability device 150, 155 may include two or more radios supporting concurrent communication on WWAN and WLAN carriers.

Within the wireless network 100, each mobile device may utilize a single carrier or multiple carriers for downlink and uplink communications. A carrier may refer to a range of frequencies used for communication and may have certain associated characteristics, such as the type of radio and protocols in use at that frequency. When a mobile device 120, 155 communicates on multiple carriers, the downlink and uplink carriers may be referred to as component carriers. Operation on multiple component carriers may be referred to as multi-carrier operation or carrier aggregation. Carrier aggregation configurations may be symmetric (a same number of DL component carriers as UL component carriers), or asymmetric (a different number of DL and UL component carriers). Also, a set of the frequency division duplexing (FDD) carrier may be aggregated with a set of the time-division duplexing (TDD) carrier, for instance LTE-FDD+WLAN-TDD.

As discussed herein, carrier aggregation may be performed for heterogeneous carriers. For example, depending upon their respective capabilities, a base station 150 and a mobile device 155 may communicate on two or more WWAN carriers and at least one WLAN carrier. Wireless devices which support concurrent communication on both cellular and WLAN carriers will be referred to herein as a "dual-capability" devices. Aggregation may increase available spectrum while also preserving the ability of the WWAN network to control communications on each carrier that is configured for the mobile device. In one example, an E-UTRA network controls various communication operations for the aggregated WLAN carrier. Control of the WLAN carrier may include, for example, determining which traffic will be conveyed on the WLAN carrier, carrier activation and deactivation, managing association and authentication to the WLAN AP, controlling the modulation and coding rate used on the WLAN up and downlinks, and addressing other issues associated with the aggregation of the WLAN and non-WLAN carriers.

The aggregation of heterogeneous carriers may be performed below the internet protocol (IP) layer such as at the media access control (MAC), radio link control (RLC), or packet data convergence (PDCP) layer of the E-UTRA protocol architecture. In one case, aggregation of the WLAN carrier is performed at the MAC layer and adapted for use with LTE systems.

It is noted that LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
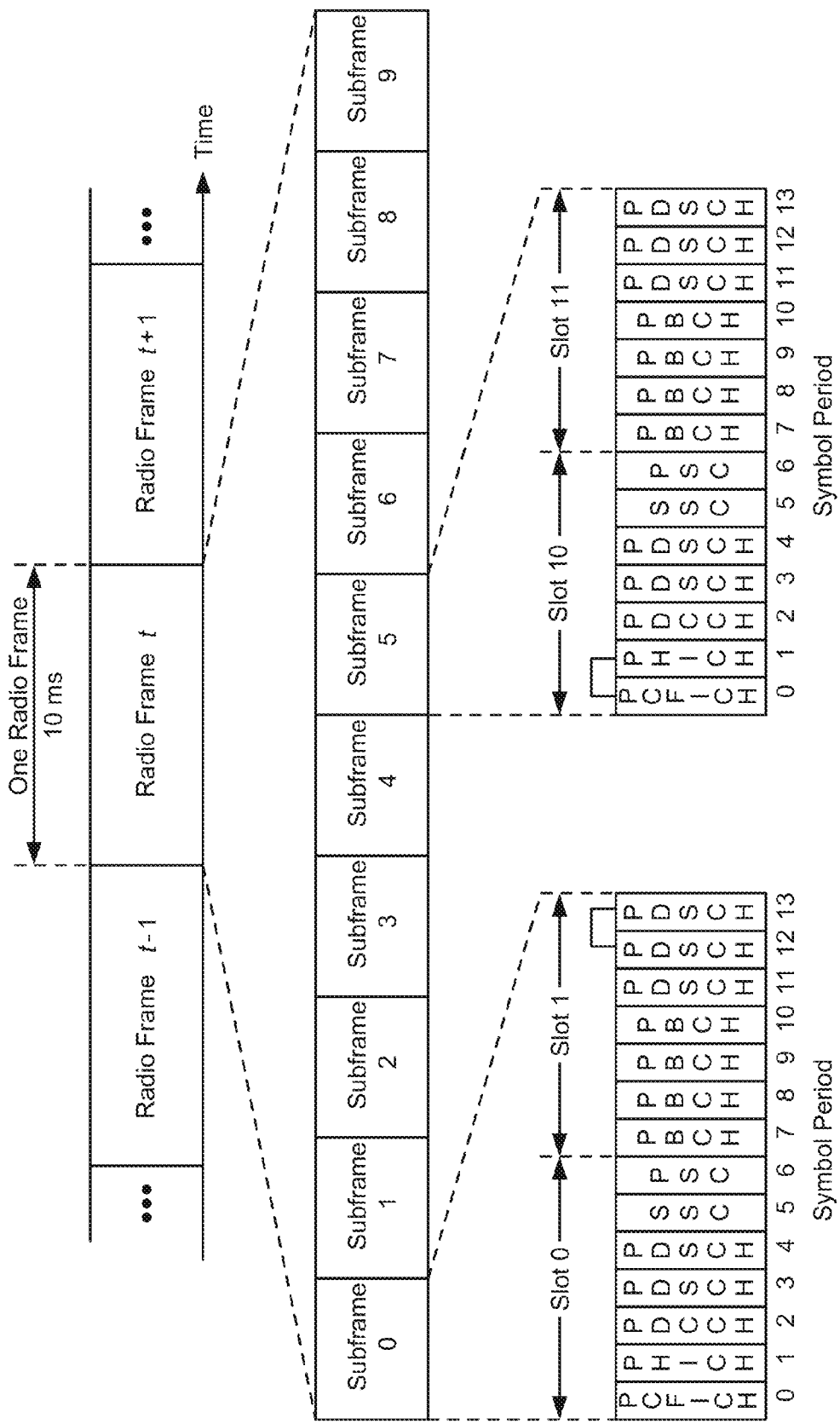
FIG. 2 is a block diagram illustrating an example of a downlink frame structure in a telecommunications system.

FIG. 2 shows a downlink frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 14 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. Hybrid Automatic Repeat reQuest (HARQ) provides a combination of high-rate forward error-correcting coding and Automatic Repeat reQuest (ARQ) error-control. The eNB may send a Physical HARQ Indicator Channel (PHICH) and a Physical Downlink Control Channel (PDCCH) in the first M symbol periods of each subframe (M=3 in FIG. 2). As such, the PHICH may carry information to support HARQ or the like. The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search. It is noted that a UE may be within the coverage of multiple eNBs. One of these eNBs may be selected to serve the UE. The serving eNB may be selected based on various criteria such as received power, path loss, signal-to-noise ratio (SNR), etc.

Figure 3:
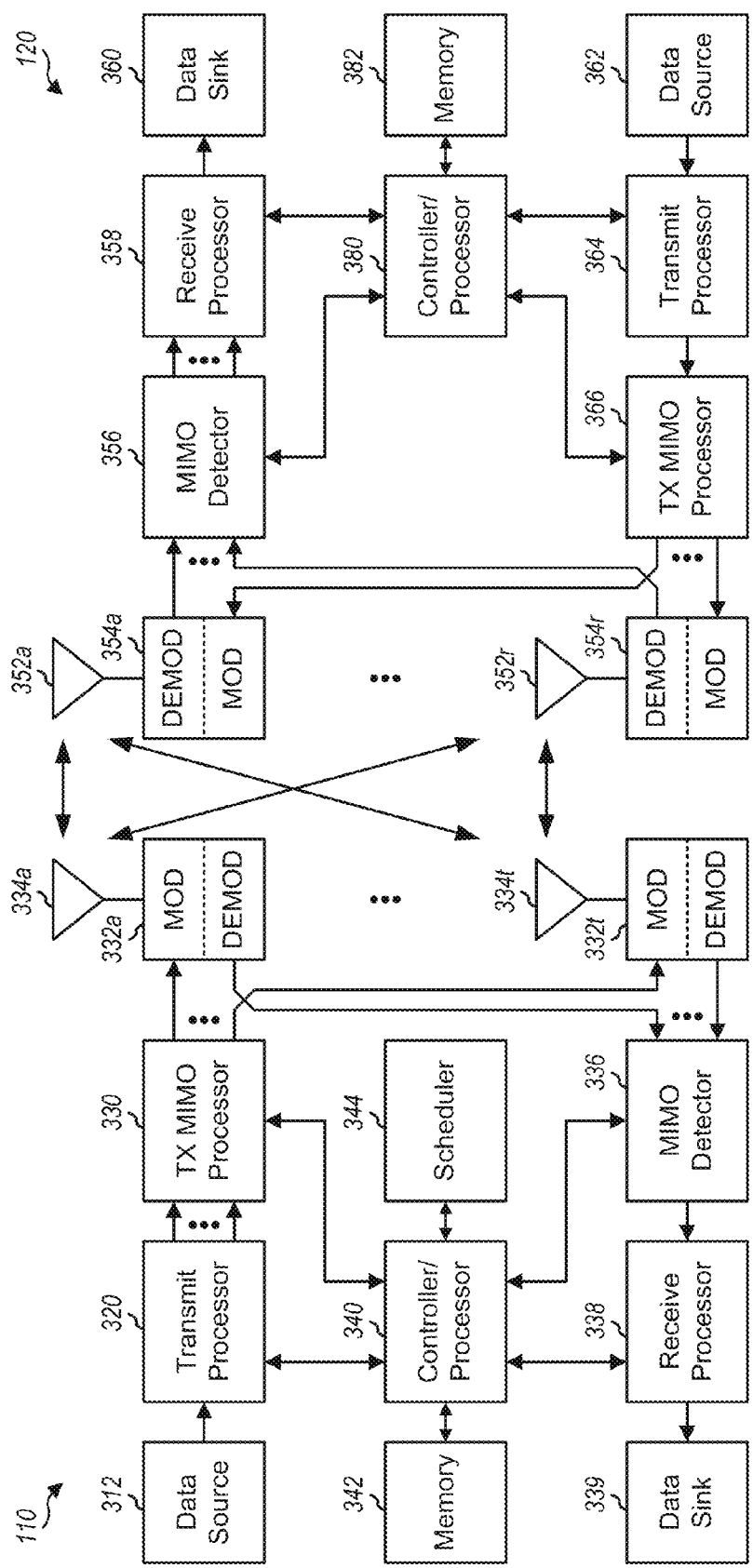
FIG. 3 is a block diagram illustrating a design of a base station and a UE configured according to one aspect of the present disclosure.

FIG. 3 shows a block diagram of a design of a base station/eNB 110 and a UE 120, which may be dual-capability devices that operate generally as discussed in connection with FIG. 1. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODS) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE-MODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

Figure 4:
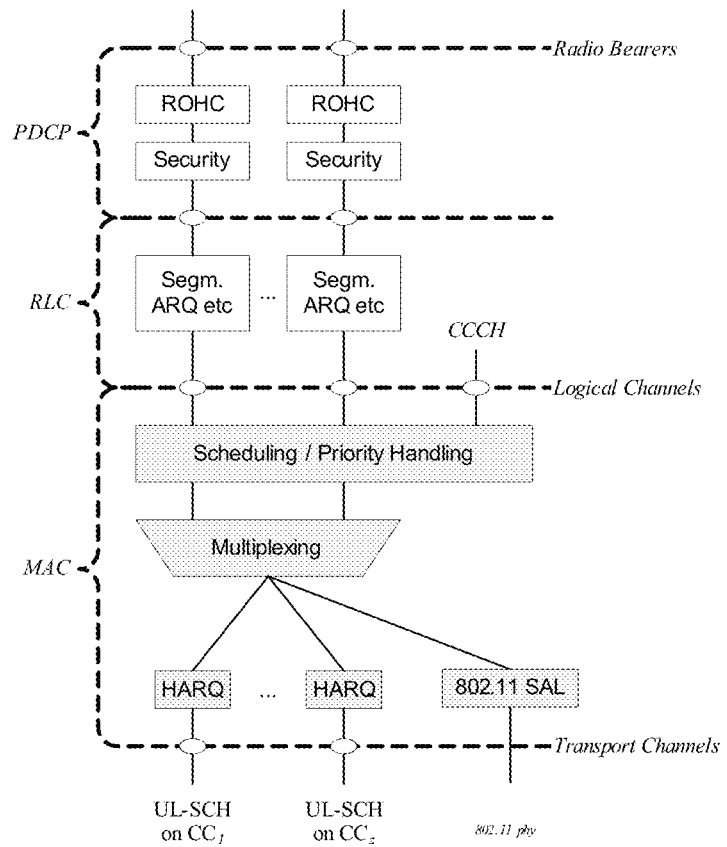
FIG. 4 shows carrier aggregation for uplink in accordance with aspects of the embodiments described herein.

As noted above, the base station 110 and the UE 120 may be dual-capability devices that support concurrent communication on both cellular and WLAN carriers. The base station 110 and the UE 120, and components thereof, may be configured for carrier aggregation of heterogeneous carriers. In one aspect, there is provided a carrier aggregation technique that leverages LTE architecture. The technique generally involves performing the aggregation with a WLAN at the HARQ entity level (in the MAC layer), as illustrated in the FIG. 4. As one example, FIG. 4 shows an exemplary arrangement in which, at the MAC layer, a dual-capability device includes protocol entities for a first and second LTE/UMTS carrier (i.e., HARQ entities for component carriers (CCs), such as CC1, CC2 as well as a protocol entity for WLAN carrier (802.11 SAL). These protocol entities are shown as coupled with a multiplexer and a scheduling element for aggregating protocol data units (PDUs) associated with the dissimilar carriers. Aspects of this protocol architecture may be incorporated in a controller, processor, scheduler, and/or other elements as described herein. In related aspects, the aggregation of the WWAN carrier and the WLAN carrier may be performed at other layers below the IP layer, such as, for example, a Radio Link Control (RLC) layer, a Packet Data Convergence Protocol (PDCP) layer, or the like.

The controllers/processors 340 and 380 may direct the operation at the base station 110 and the UE 120, respectively. The processor 340 and/or other processors and modules at the base station 110 may perform or direct the execution of the functional blocks illustrated in FIGS. 4 and 5, and/or other processes for the techniques described herein. The processor 380 and/or other processors and modules at the UE 120 may also perform or direct the execution of the functional blocks illustrated in FIGS. 4 and 6, and/or other processes for the techniques described herein. In related aspects, the processor(s) 340 and/or 380 may generate a carrier aggregation configuration. A scheduler 344 may schedule UEs for data transmission on the downlink and/or uplink, and may also schedule transmissions on the cellular or WLAN carriers. The memories 342 and 382 may store data and program codes for the base station 110 and the UE 120, respectively, including data/code for executing aggregation of the cellular or WLAN carriers. For example, the controller/processor 380 may implement a protocol stack that supports a traffic mapping function with respect to heterogeneous carrier aggregation. FIG. 4 provides an example of such a protocol stack in which the MAC layer protocol entity multiplexes the cellular/WLAN traffic and includes a scheduling/priority handling block or entity that handles MAC layer mapping operations. In another example, the controller/processor 380 may implement a protocol stack in which an RLC layer entity handles mapping operations and scheduling/priority operations. While FIG. 4 illustrates aspects of uplink operation, the same principles hold for the downlink operation.

More specifically, at the UE 120, the receive processor 358 and/or the MIMO detector 356 may be configured to receiving a configuration for aggregating a plurality of component carriers comprising at least one cellular carrier and a WLAN carrier, wherein the aggregation is performed at a given protocol layer of the UE 120 below an IP layer. The controller or processor 380, in conjunction with the memory 382, may be configured to determine, at the given protocol layer, a mapping of uplink traffic in relation to the at least one cellular carrier and the WLAN carrier. The transmit processor 364 and/or the TX MIMO processor 366 may be configured to sending an uplink transmission based at least in part on the mapping.

The mapping may be based on a traffic flow identifier, which may be: a logical channel identifier (LCID) if the given protocol layer is a media access control (MAC) protocol layer; or a bearer identifier if the given protocol layer is above the MAC protocol layer. In one example, the processor 380 may be configured to: determine the LCID associated with data for the uplink transmission; determine, based on the mapping, one or more traffic restrictions associated with the LCID; and select a carrier from the plurality of component carriers in accordance with the one or more traffic restrictions. In another example, the processor 380 may be configured to: determine the bearer identifier associated with data for the uplink transmission; determine the bearer identifier associated with data for the uplink transmission; and select a carrier from the plurality of component carriers in accordance with the one or more traffic restrictions. The transmit processor 364 and/or the TX MIMO processor 366 may be configured to send the data in the uplink transmission on the selected carrier.

The processor 380 may be configured to determine an association of traffic types with respective ones of the plurality of component carriers based on downlink traffic received by the UE 120, wherein the mapping of uplink traffic mirrors the association of traffic types determined based on the downlink traffic.

A first traffic type may be associated with the at least one cellular carrier and a second traffic type may be associated with the WLAN carrier, wherein given layer comprises a MAC protocol layer. The processor 380 may be configured to performing carrier selection at the MAC protocol layer based on the association and a type of the uplink traffic.

The processor 380, the receive processor 358, and/or the transmit processor 364 may be configured to: receive an uplink grant indicating an allocation of uplink resources on a first cellular carrier in the plurality of component carriers; identify data for the uplink transmission on the first cellular carrier based on the mapping; and send the data on the first cellular carrier in accordance with the uplink grant.

The processor 380 and/or the transmit processor 364 may be configured to: determine the availability of data for uplink transmission; determine, based on the mapping, a carrier in the plurality of component carriers for sending the data; and send the data in the uplink transmission absent an uplink grant, in response to determining that the data maps to the WLAN carrier.

The processor 380 and/or the transmit processor 364 may be configured to: select a given one of the plurality of component carriers at the media access control (MAC) layer; and multiplex the uplink traffic onto each carrier based at least in part on the mapping, wherein the mapping is based at least in part on Quality of Service (QoS) information. The processor 380 and/or the transmit processor 364 may be configured to: form MAC protocol data units (PDUs) based on the mapping; and send the MAC PDUs based on an uplink grant or a MAC PDU size.

The mapping may indicate that the uplink traffic may use either the at least one cellular carrier or the WLAN carrier, and the aggregation may be performed at the MAC layer. The processor 380 may be configured to: form PDUs at the RLC layer; and transport the PDUs via the at least one cellular carrier or the WLAN carrier.

The processor 380 may be configured to cease applying the mapping in response to deactivation of at least one carrier in the plurality of component carriers. The processor 380 may be configured to: disable a Dynamic Host Configuration Protocol (DHCP) above the IP layer for the WLAN carrier in connection with the configuration for aggregating the plurality of component carriers; determine an IP address for a cellular radio module of the UE 120; and assign the IP address to the WLAN radio module of the UE 120. The processor 380 may be configured to instruct the transmit processor 364 to signal a cellular-WLAN carrier aggregation capability of the UE 120 to at least one network entity (e.g., the eNB 110).

The receive processor 358 and/or the MIMO detector 356 may be configured to receive a beacon or probe response from a WLAN access point (AP), the beacon or probe response advertising support for cellular-WLAN carrier aggregation by the WLAN AP. The receive processor 358, MIMO detector 356, and/or the processor 380 may be configured to: obtain security credentials from a cellular base station; and provide the security credentials to a WLAN AP.

The receive processor 358 and/or the MIMO detector 356 may be configured to receive dynamic signaling from a network entity indicating which bearers are sent over which carriers. For example, the signaling may indicate, for each LCID in a plurality of LCIDs, which carrier in the plurality of component carriers to use for corresponding uplink traffic.

At the base station 110, the transmit processor 320, the TX MIMO processor 330, and/or the controller/processor 340 may be configured to send a configuration to a mobile device for aggregating a plurality of component carriers comprising at least one cellular carrier and at least one WLAN carrier, wherein the aggregation is performed at a layer of the mobile device below an IP layer. The processor 340 and/or the scheduler 344 may be configured to determine a downlink mapping of downlink uplink traffic in relation to the at least one cellular carrier and the at least one WLAN carrier. The receive processor 338 and/or the MIMO detector 336 may be configured to receive the uplink traffic based at least in part on the downlink mapping.

In one example, the processor 340 and/or the scheduler 344 may be configured to: determine the LCID associated with data for the uplink transmission; determine, based on the mapping, one or more traffic restrictions associated with the LCID; and select a carrier from the plurality of component carriers in accordance with the one or more traffic restrictions. In another example, the processor 340 and/or the scheduler 344 may be configured to: determine the bearer identifier associated with data for the uplink transmission; determine, based on the mapping, one or more traffic restrictions associated with the bearer identifier; and select a carrier from the plurality of component carriers in accordance with the one or more traffic restrictions. The receive processor 338 and/or the MIMO detector 336 may be configured to receive the data in the uplink transmission on the selected carrier.

The transmit processor 320 may be configured to send an uplink grant indicating an allocation of uplink resources on a first cellular carrier in the plurality of component carriers. The receive processor 338 may be configured to receive data on the first cellular carrier in accordance with the uplink grant.

Carrier aggregation may performed at the MAC layer, and the receive processor 338 may be configured to receive MAC PDUs based on an uplink grant or a MAC PDU size. The transmit processor 320 may be configured to, at the RLC layer, transport PDUs via the at least one cellular carrier or the WLAN carrier.

In one example, the transmit processor 320 may be configured to send dynamic signaling indicating which bearers are sent over which carriers, wherein the signaling indicates a packet size threshold, a default carrier, and which carrier to use in response to the packet size exceeding the threshold. In another example, the mapping may include a static policy, wherein the static policy includes an access network discovery and selection function (ANDSF) or the like.

With respect to dual-capability devices (e.g., the mobile device 155 and the base station 150 of FIG. 1), such devices include at least two radios, in addition to the elements shown for the base station 110 and UE 120 of FIG. 3. In the example of FIG. 1, the mobile device 155 and the base station 150 each include a WWAN radio (e.g., the WWAN radio of FIG. 3, or the like), but each additionally include a WLAN radio, thereby allowing for concurrent operation of a WLAN carrier with a non-WLAN carrier. With LTE Rel-10, the aggregation of homogenous LTE carriers is performed by the MAC. However, the LTE Rel-10 MAC layer does not support QoS at a component carrier level, does not recognize different capabilities associated with aggregated carriers, and does not enable a sub-IP layer mapping of traffic.

In accordance with aspects of the present disclosure, there are provided a dual-capability base station (e.g., the eNB 110) and a dual-capability mobile device (e.g., the UE 120) which are configured for aggregation of a WLAN carrier with a non-WLAN carrier, below the IP layer (e.g., at the MAC layer). In one embodiment, the WWAN base station and the WLAN AP 150 may be co-located. With reference to the embodiment of FIG. 5, there is shown a network entity or base station 500 that includes a cellular/WWAN base station co-located with a WLAN AP. The network entity 500, for example, may include aspects of the dual-capability base station 150 (FIG. 1) and/or base stations 110 (FIG. 1, FIG. 3) with their respective functionality.

In the present example, the network entity 500 includes a cellular/WWAN radio module 510 and a WLAN radio module 520. The network entity 500 may optionally include a controller module 530 in operative communication with the cellular/WWAN radio module 510 and the WLAN radio module 520 to coordinate the activity of the modules 510, 520 and/or components thereof.

In related aspects, the cellular/WWAN radio module 510 may include a transmitter (TX) component 512, a receiver (RX) component 514, a processor component 516, and a HARQ component 518, wherein each of the components are in operative communication with each other. The cellular/WWAN radio module 510 may include one or more of the components of base station 110 shown on the left hand side of FIG. 3. The WLAN radio module 520 may include a TX component 522, a RX component 524, and a processor component 526, wherein each of the components are in operative communication with each other. In further related aspects, one or more of the components 512-518 and/or 522-526 may be configured to perform the carrier aggregation operations described herein, such as, for example, the exemplary methodologies shown in FIGS. 7A-E, 8-9, and 13A-D, and described in further detail below.

Figure 5:
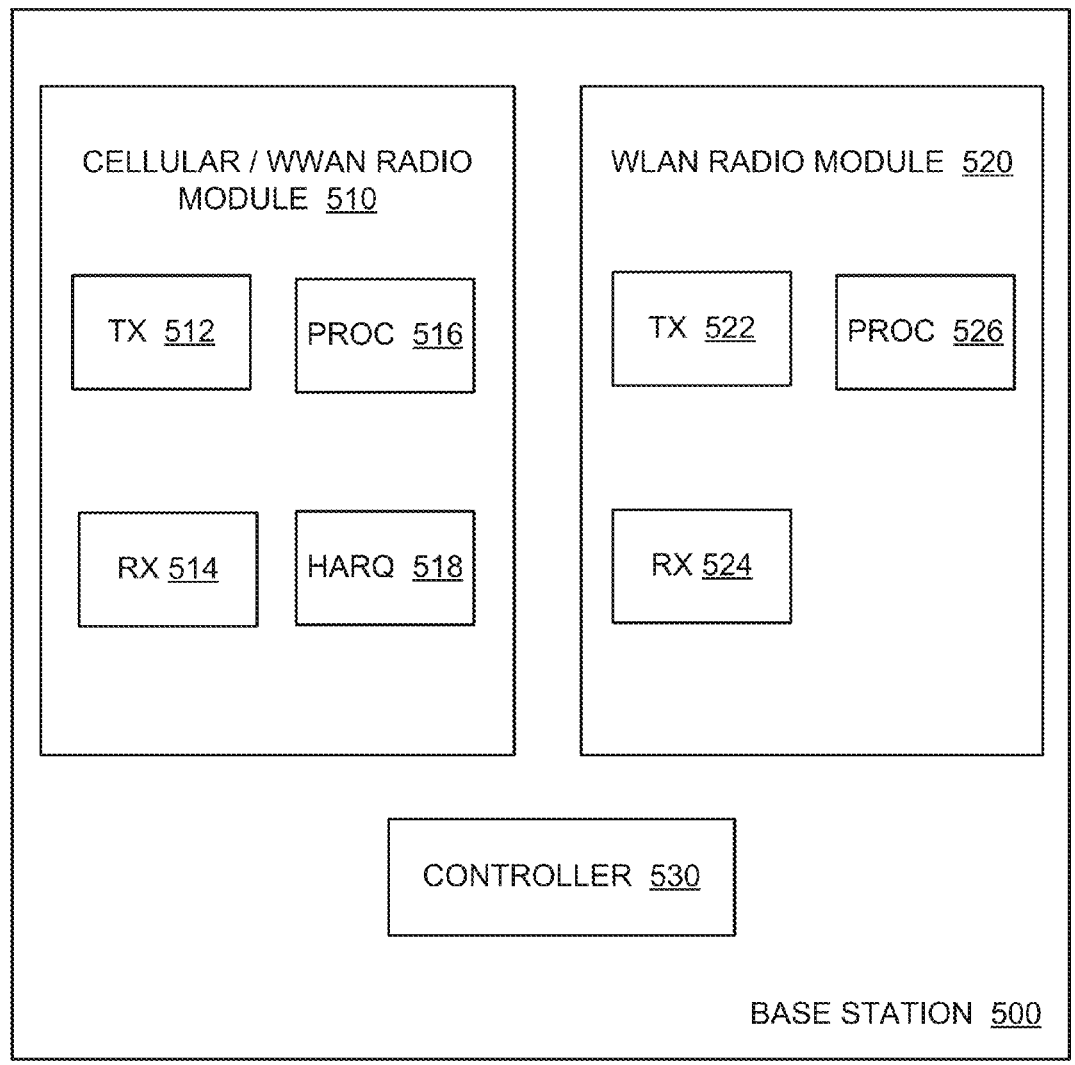
FIG. 5 illustrates an exemplary base station that includes a cellular/WWAN radio module and a WLAN radio module.
Figure 6:
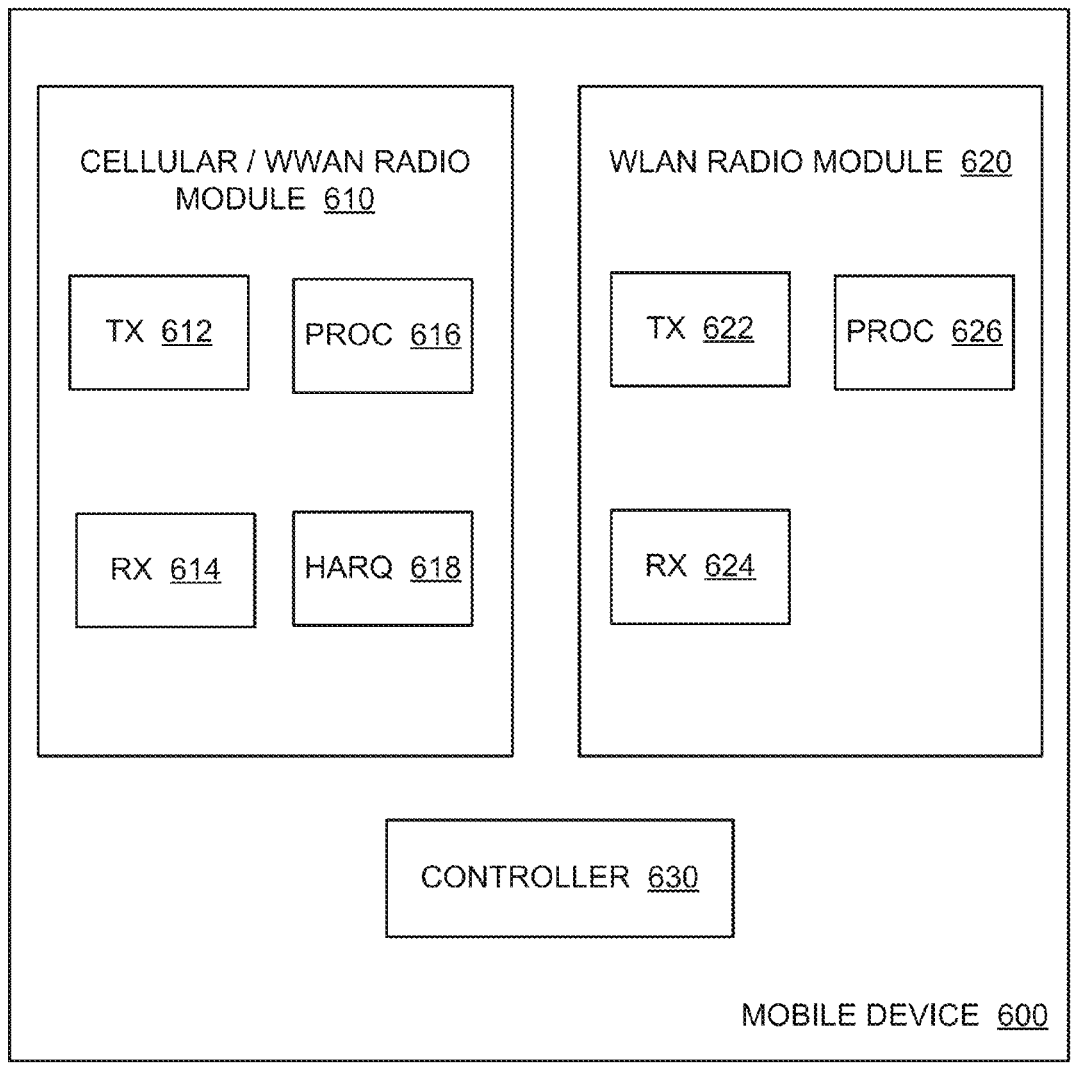
FIG. 6 illustrates an exemplary mobile device that includes a cellular/WWAN radio module and a WLAN radio module.

With reference to FIG. 6, there is shown an exemplary dual-capability mobile device 600 that includes a cellular/WWAN radio module 610 and a WLAN radio module 620, and is basically analogous to the dual-capability base station 500 of FIG. 5. The cellular/WWAN radio module 610 may include one or more of the components of mobile device 120 shown on the right hand side of FIG. 3 and/or the functionality of mobile device 155. For the sake of conciseness, the rest of the details regarding the mobile device 600 are not further elaborated on; however, it is to be understood that the remaining features and aspects of the mobile device 600 are substantially similar to those described above with respect to the base station 500 of FIG. 5. In related aspects, one or more of the components 612-618 and/or 622-626 may be configured to perform the carrier aggregation operations described herein, such as, for example, the exemplary methodologies shown in FIGS. 8, 10A-B, 11A-E, and 12A-B, and described in further detail below.

In accordance with aspects of the subject of this disclosure, there is provided a wireless network (e.g., an LTE or UMTS network) configured to include and control one or more WLANs. The wireless network may include one or more dual-capability network entities with features for cellular-WLAN carrier aggregation, such as, for example, WWAN-WLAN carrier aggregation. For illustrative purposes, described herein are techniques to perform aggregation of LTE and WLAN carriers below the IP layer, and fully integrated with the E-UTRA.

Configuration of a WLAN secondary cell (Scell): With reference once again to FIG. 4-6, in one aspect of WLAN carrier aggregation, the WLAN carrier is under control of the E-UTRA network (E-UTRAN) and may be configured by signaling from the LTE/UMTS carrier. E-UTRAN, for example, may use RRC to control the association and authentication of the WLAN station to a given AP, also referred to as adding or removing a WLAN Scell. For example, the base station's RRC (re)configuration message may specify one or more parameters used for communication on the WLAN carrier: (a) WLAN channel number that uniquely identifies the carrier; and/or (b) the service set identification (SSID) of the target WLAN, such as service provided by dual-capability base station 500. As described herein, base station 500 may control configuration as well as activation and deactivation of the WLAN carrier. In some aspects, the UMTS/LTE carrier may serve a primary component carrier (PCC) over which configuration and control information is received for the secondary WLAN carrier.

In related aspects, with reference to FIGS. 5-6, component(s) of the base station's cellular radio module 510 (e.g., the processor component 516) may generate the RRC (re)configuration message or the like, which may be sent by the TX component 512 to the RX component 614 in the mobile device's cellular radio module 610.

Authentication to a WLAN Scell: 3GPP, IEEE, and other standard bodies have standardized methods that allow a mobile device to seamlessly authenticate onto a WLAN network under the control of the operator. While such methods may be implemented, they may involve having the mobile device contact servers, such as, for example, authentication, authorization, and accounting (AAA) servers laying outside of the local area network. This adds latency to the WLAN authentication, as well as traffic on the E-UTRAN. Advantageously, base station 500 avoids this latency and added complexity by collocating the WWAN eNB with the WLAN AP (e.g., when the cellular/WWAN radio module is co-located with the WLAN radio module).

As one example of direct access and authentication, base station 500 may provide a temporal key to the UE in order to let it authenticate with the WLAN. Such a key can be included in the RRC (re)configuration message carried by the UMTS/LTE carrier. When the eNB and AP are co-located, they may be configured with or exchange a set of the keys, and may burn a new key for each new authentication of a WLAN station (e.g., the WLAN radio module 620 of the mobile device 600) on the AP. The key may be transported securely due to RRC/PDCP operation on the LTE carrier. The WLAN authentication performed by the mobile device 600 towards the base station 500 (AP) may use that shared key.

In related aspects, with reference to FIGS. 5-6, the base station's processor 516 in its cellular radio module 510 may generate and provide the key that is included in the RRC (re)configuration message sent by the TX component 512 to the RX component 614 in the mobile device's cellular radio module 610. In further related aspects, the base station's cellular radio module 510 may provide the key to the co-located WLAN radio module 520.

Controlling the WLAN carrier—Downlink: The eNB/AP (e.g., the base station 500 with radio modules 510, 520) may decide when to schedule on the LTE carrier or the WLAN carrier. The eNB/AP (e.g., the radio modules 510, 520) may inform the WLAN station (e.g., WLAN radio module 620) when it does not plan to use the WLAN carrier for some future time via the activation/deactivation command. In one aspect, activation or deactivation commands for the WLAN CC may be sent on the LTE/UMTS CC. The WLAN station may use the activation/deactivation information to enable a suitable sleep mode on the WLAN interface. The eNB/AP may use flow classification or packet inspection techniques to select whether a packet should be transmitted over LTE or WLAN CC. It is noted that such activation or deactivation commands affect the configured carriers, and therefore affects mapping, carrier selection, QoS, etc.

Controlling the WLAN carrier—Uplink: While the WLAN CC is activated, it may continue to pull data for transmission from the transmit buffers. In some situations (e.g., voice over LTE) the eNB/AP may desire to steer some transmissions over LTE and others over WLAN. However, the LTE MAC may be agnostic to Quality of Service (QoS) and may have been designed with the assumption that all carriers provide similar quality of service. To alleviate this, a new parameter may be associated with each logical channel ID (LCID) in order to indicate if that LCID can/cannot be transported over a WLAN carrier. As the MAC/HARQ entity builds a MAC PDU and obeys the uplink logical channel prioritization and multiplexing rules it also ensures the LCID selected is allowed on the target carrier.

In related aspects, with reference to FIGS. 5-6, the processors 516, 616 of the cellular radio modules 510, 610 may control and handle decisions regarding whether transmissions will be over LTE or WLAN. The HARQ components 518 and/or 618 may (alone or in conjunction with the processors 516 and/or 616) build the MAC PDU and handle compliance with the uplink logical channel prioritization and multiplexing rules. In further related aspects, additional details and approaches to steering certain types of uplink traffic toward WWAN or WLAN carrier types are provided below in the context of mapping/associating certain types of traffic to/with certain carriers.

Discovery and association with the WLAN: As specified in the 802.11 standard, the discovery and association procedure is generally initiated by the WLAN station (e.g., the WLAN radio module 620 of the mobile device 600). The WLAN station may however need to know if this particular WLAN is a WLAN which is managed by the E-UTRAN. For example, the WLAN station should not trigger the upper layers to perform Dynamic Host Configuration Protocol (DHCP) on a carrier managed by the E-UTRAN. It is noted that a dual-capability mobile device (e.g., the mobile device 600) may announce (e.g., via TX components 612 and/or 622) that it is capable of cellular-WLAN carrier aggregation, and may additionally send information regarding the frequencies it can support. In another example, the secondary WLAN carrier uses the same IP address as cellular carriers, which follows from carrier configuration. A practical consequence is that the WLAN avoids initiating DHCP to get is own IP address.

In one approach, the WLAN AP (e.g., the WLAN radio module 520 of the base station 500) may indicate this capability in the Beacon, Probe Response or via the Access Network Query Protocol or the Generic Advertisement Service. In another approach, the eNB (e.g., the cellular radio module 510 of the base station 500) may broadcast information about the availability of a WLAN carrier in a specified system information block (SIB). This has the advantage that the mobile device could use this information to connect to WLAN even if it had switched off the WLAN for power consumption purposes. In this case the eNB (e.g., the TX component 512 of the cellular radio module 510) may broadcast some details about the WLAN (e.g., basic SSID (BSSID), SSID, frequency, channel, or the like). In yet another approach, the RRC reconfiguration message mentioned above may be used for this purpose.

It is noted that the dual scenario is also important—i.e., making sure that STAs (e.g., the WLAN radio module 620 in the mobile device 600) which do not support this capability either not connect to the WLAN or get a normal WLAN behavior. For this purpose the WLAN station which supports the WLAN carrier aggregation feature could provide this indication in the Association Request message.

Mapping of traffic to specific carrier: With the aggregation of homogeneous carriers in LTE, it may be assumed that the carriers have the same capabilities and provide the same QoS; however, this is not the case when heterogeneous carriers, such as when LTE and WLAN are aggregated together. Some traffic, e.g., voice over IP (VoIP), may be preferred over LTE rather than WLAN. The eNB/AP (e.g., the cellular and WLAN radio modules 510, 520 of the base station 500) is in control of which carrier to use for downlink packets. However for the uplink the multiplexing and carrier selection is done at the UE's MAC which does not have any QoS knowledge. To provide the MAC with QoS knowledge, the following approaches may be used.

A static mapping between logical channels (i.e., bearers) and carrier could be defined by the standard or configured by the operator. For example, the eNB/AP (e.g., the cellular and WLAN radio modules 510, 520 of the base station 500) may be configured to refrain from using the WLAN carrier when QoS class identifier (QCI)=1 is used. In related aspects, the static mapping may include a static policy, which in turn may include an access network discovery and selection function (ANDSF) or the like.

The network entity knowing about a traffic requirement (e.g., the Packet Data Network Gateway (PDN GW)) may indicate dynamically via explicit signaling (e.g., a flag in a GPRS tunneling protocol (GTP) message) to the eNB (e.g., the cellular radio module 510) if a given bearer/logical channel can be sent over a given carrier or not.

Packets could be marked by a network entity which has knowledge about traffic requirements. This may be the PDN GW (or TDF) but could be also the eNB above or at PDCP layer (since below that layer packets are ciphered). The marking and the respective meaning need however to be communicated in some form to the MAC layer. As explained above, the LTE MAC may be agnostic to QoS and may have been designed with the assumption that all carriers provide similar quality of service. To alleviate this, a new parameter or marking may be associated with each LCID, resulting in an extended LCID, to indicate whether that LCID can be transported over a WLAN carrier.

For uplink, current LTE carrier aggregation assumes that the grants provided to the UE (e.g., cellular radio module 610 or component(s) thereof) are specific for a given carrier. However the grants are agnostic of the actual type of data traffic sent to the carrier. If there is a need to send some traffic to specific carriers an approach may be implemented wherein the UE may have policies about which traffic can be sent over which carrier. Therefore when the UE receives a grant from the network for a specific carrier, the UE is responsible to send the correct traffic to the given carrier based on policies. In a related fifth approach, the MAC layer may indicate that the grants are traffic-specific.

The UE (e.g., cellular radio module 610 or component(s) thereof) may mirror the traffic to carrier mapping performed by the network, i.e., if the network sent a specific traffic flow over a given carrier, the respective uplink traffic will be sent to the same carrier. With this approach, when the UE initiates the connection it may initially use the wrong carrier, but may correct itself by determining an association of traffic types with WWAN or WLAN carrier types for downlink traffic, and mirroring the association when sending further uplink traffic.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7A:
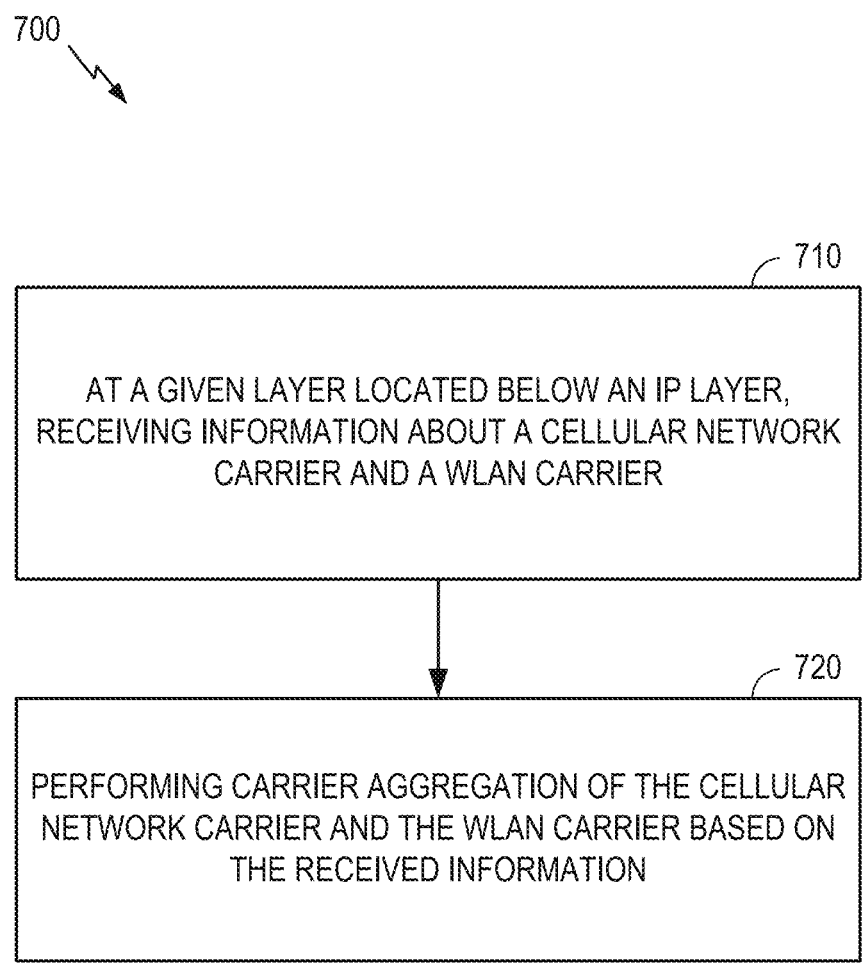
FIGS. 7A-E and 8 show examples of a carrier aggregation methodology operable by a network entity.

With reference to FIG. 7A, illustrated is a methodology 700 that may be performed at a network entity, such as, for example, the cellular radio module 510 of the base station 500 in FIG. 5. The method 700 may involve, at 710, at a given layer located below an IP layer, receiving information about a cellular network carrier and a WLAN carrier. Block 710 may be performed by the RX component 514 of the cellular radio module 510 and/or the RX component 524 of the WLAN radio module 520. The method 700 may involve, at 720, performing carrier aggregation of the cellular network carrier and the WLAN carrier based on the received information. Block 720 may be performed by the processor 516 and the HARQ component 518 of the cellular radio module 510.

Figure 7B:
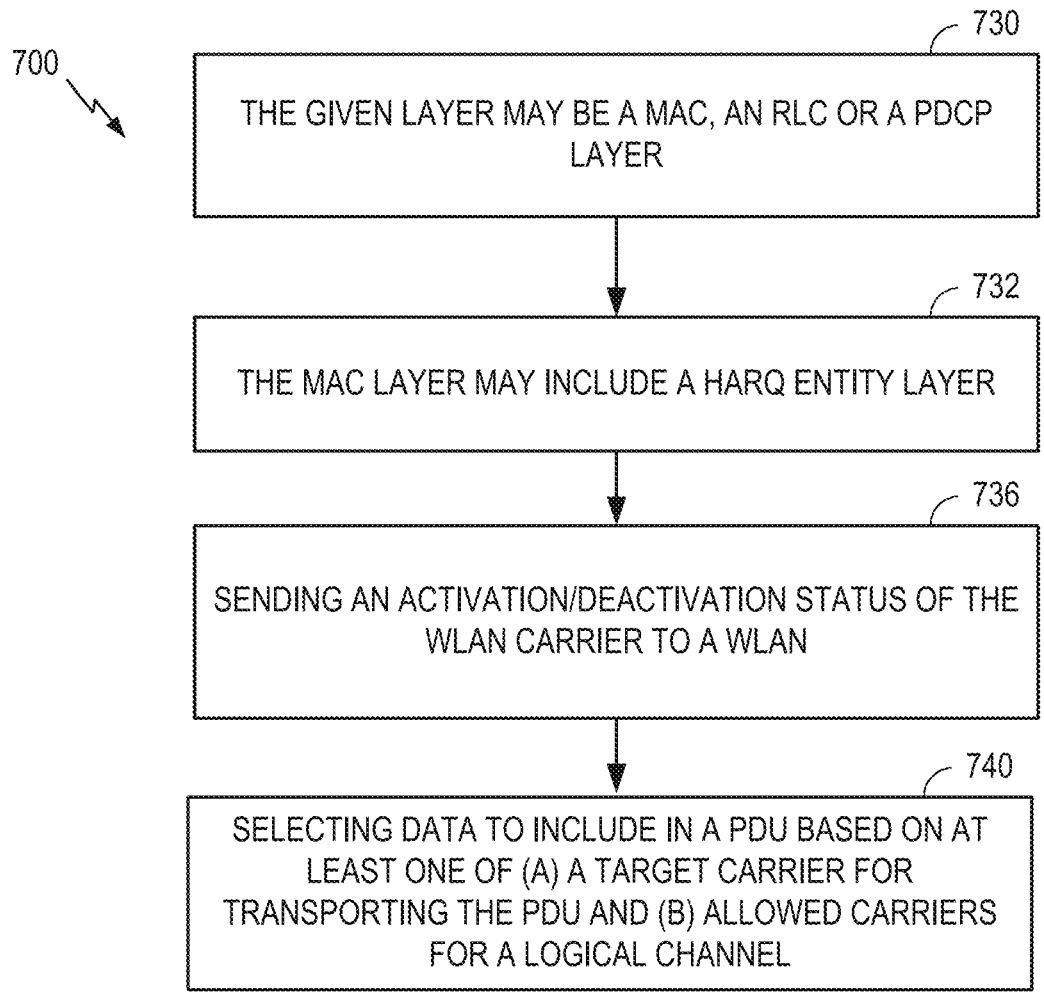

With reference to FIGS. 7B-E and 8, there are shown further operations or aspects of method 700 that are optional are not required to perform the method 700. If the method 700 includes at least one block of FIGS. 7B-E and 8, then the method 700 may terminate after the at least one block, without necessarily having to include any subsequent downstream block(s) that may be illustrated. With reference to FIG. 7B, the given layer may be a MAC, an RLC or a PDCP layer (block 730). The MAC layer may include a HARQ entity layer (block 732). The method 700 may further involve sending an activation/deactivation status of the WLAN carrier to a WLAN station (block 736). The method 700 may involve selecting data to include in a PDU based on at least one of (a) a target carrier for transporting the PDU and (b) allowed carriers for a logical channel (block 740).

Figure 7C:
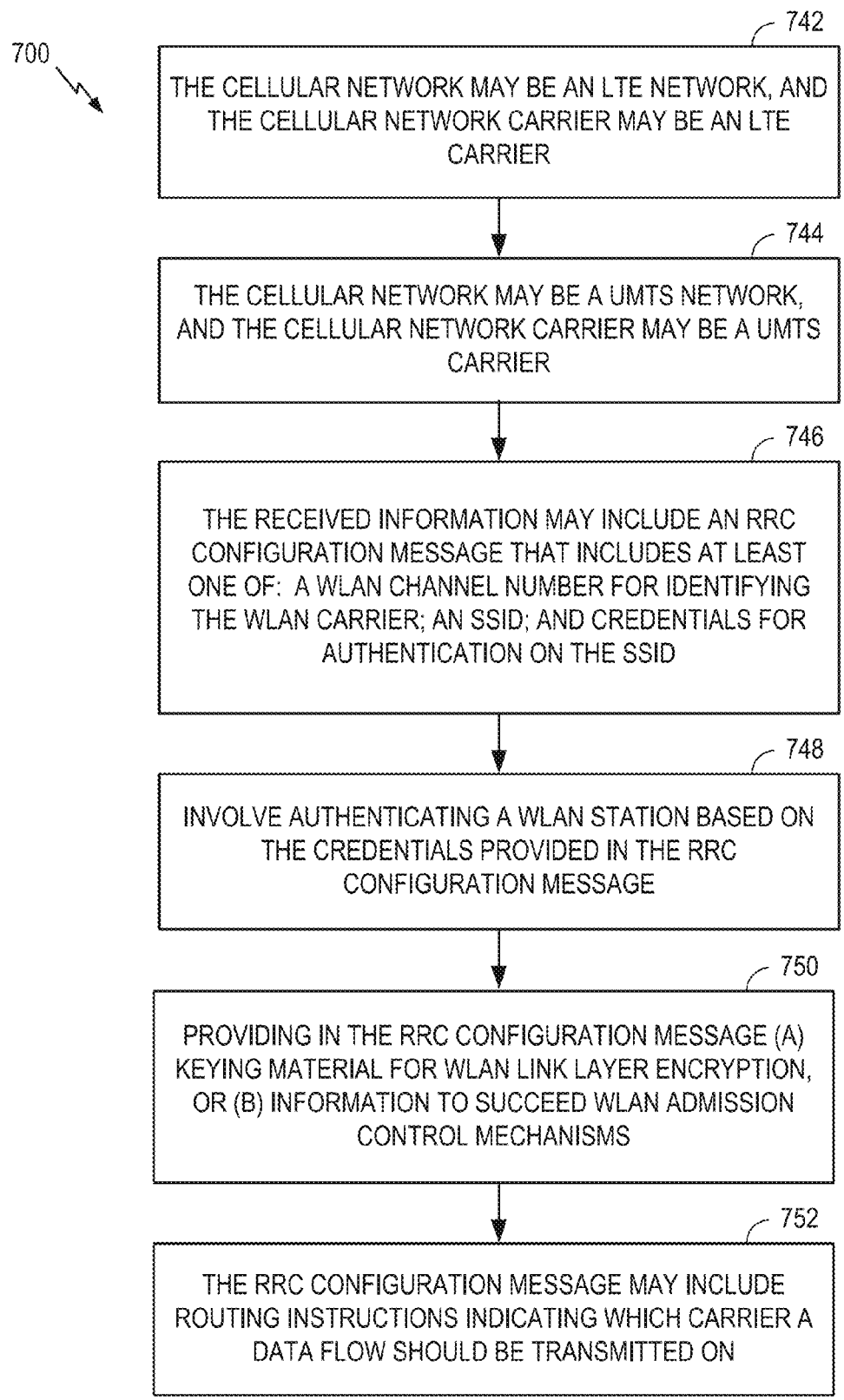

With reference to FIG. 7C, the cellular network may be an LTE network, and the cellular network carrier may be an LTE carrier (block 742). The cellular network may be a UMTS network, and the cellular network carrier may be a UMTS carrier (block 744). The received information may include an RRC configuration message that includes at least one of: a WLAN channel number for identifying the WLAN carrier; an SSID; and credentials for authentication on the SSID (block 746). The method 700 may further involve authenticating a WLAN station based on the credentials provided in the RRC configuration message (block 748). The method 700 may further involve providing in the RRC configuration message keying material for WLAN link layer encryption (block 750). The method 700 may further involve providing in the RRC configuration message information to succeed WLAN admission control mechanisms (block 750). The RRC configuration message may include routing instructions indicating which carrier a data flow should be transmitted on (block 752). The network entity may be or include an eNB or a Node B.

Figure 7D:
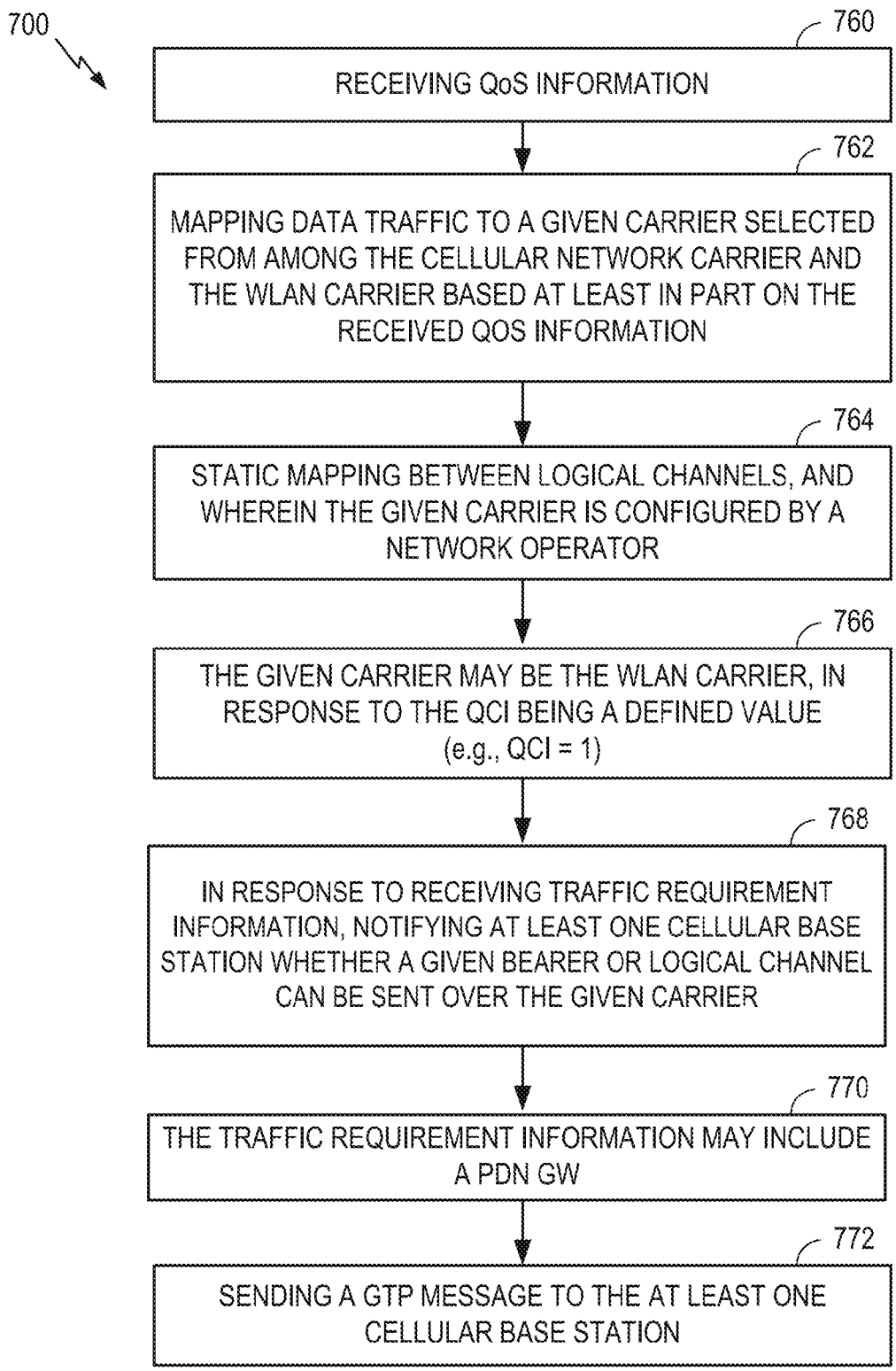

With reference to FIG. 7D, the method 700 may further involve: receiving QoS information (block 760); and mapping data traffic to a given carrier selected from among the cellular network carrier and the WLAN carrier based at least in part on the received QoS information (block 762). Block 762 may include a static mapping between logical channels, and wherein the given carrier is configured by a network operator (block 764). The given carrier may be the WLAN carrier, in response to the QCI being a defined value (e.g., QCI=1) (block 766). The method 700 may further involve, in response to receiving traffic requirement information, notifying at least one cellular base station whether a given bearer or logical channel can be sent over the given carrier (block 768). The traffic requirement information may include a PDN GW (block 770); and block 768 may include sending a GTP message to the at least one cellular base station, wherein GPRS means General Packet Radio Service (block 772).

Figure 7E:
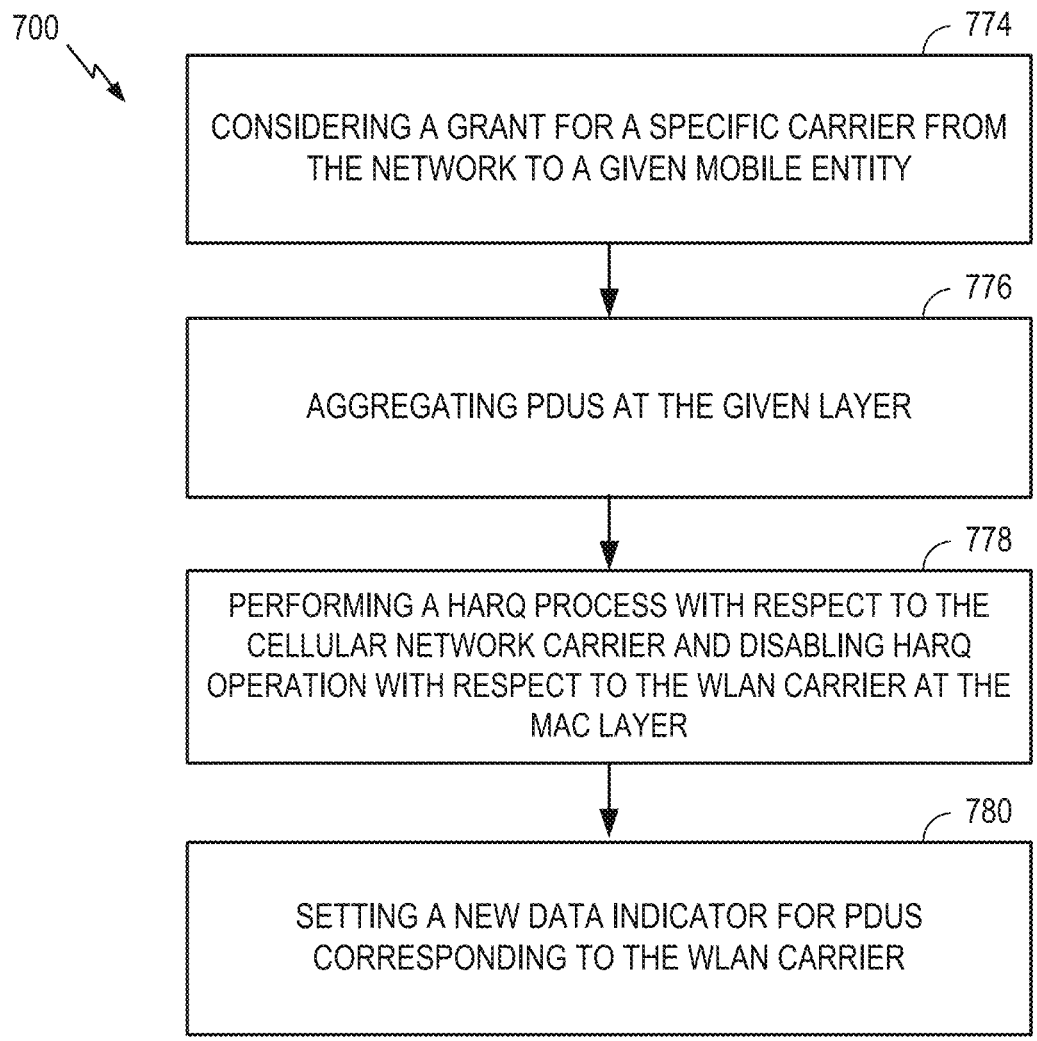
Figure 8:
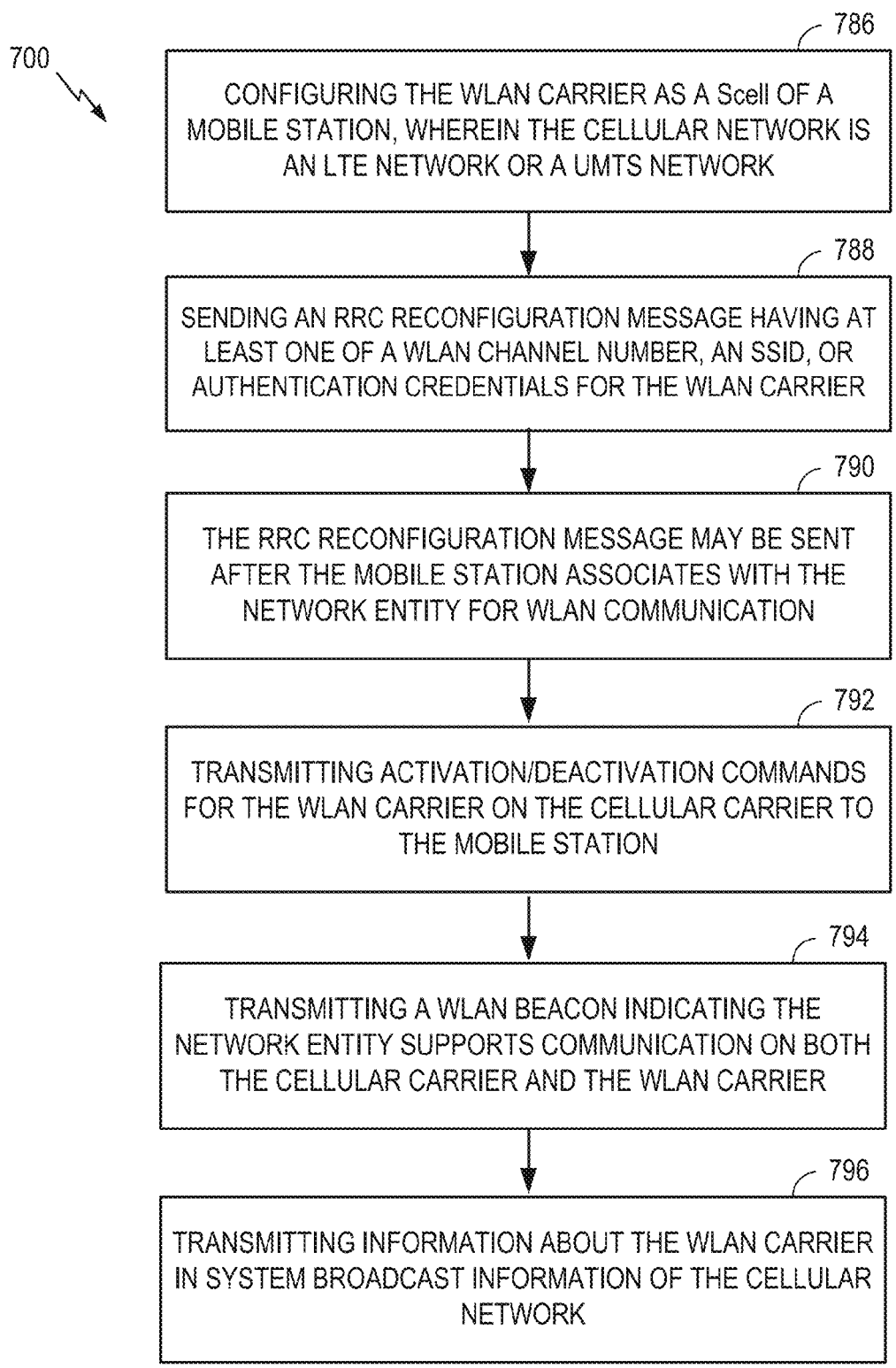

With reference to FIG. 7E, block 762 may include considering a grant for a specific carrier from the network to a given mobile entity (block 774). Block 720 may include aggregating PDUs at the given layer (block 776). The given layer may be a MAC layer, wherein the method 700 further involves performing a HARQ process with respect to the cellular network carrier and disabling HARQ operation with respect to the WLAN carrier at the MAC layer (block 778). Block 782 may include setting a new data indicator for PDUs corresponding to the WLAN carrier (block 780). The given layer may be a MAC layer, With reference to FIG. 8, the cellular network may be an LTE network or a UMTS network, and the method 700 may involve configuring the WLAN carrier as a Scell of a mobile station (block 786). Block 786 may include sending an RRC reconfiguration message having at least one of a WLAN channel number, an SSID, or authentication credentials for the WLAN carrier (block 788). The RRC reconfiguration message may be sent after the mobile station associates with the network entity for WLAN communication (block 790). The method 700 may further involve transmitting activation/deactivation commands for the WLAN carrier on the cellular carrier to the mobile station (block 792). The method 700 may further involve transmitting a WLAN beacon indicating the network entity supports communication on both the cellular carrier and the WLAN carrier (block 794). The method 700 may further involve transmitting information about the WLAN carrier in system broadcast information of the cellular network (block 796).

Figure 9:
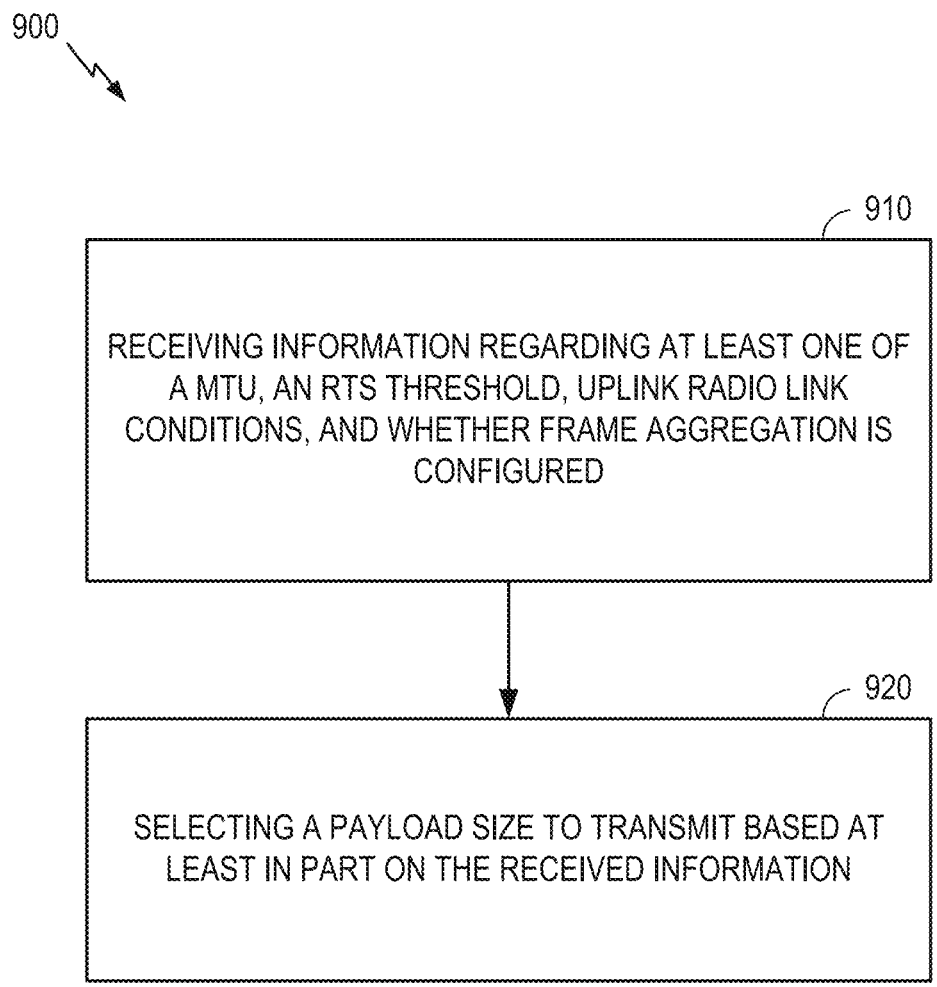
FIG. 9 illustrates another example carrier aggregation methodology operable by a WLAN AP.

With reference to FIG. 9, illustrated is a methodology 900 that may be performed by a WLAN AP or a WLAN AP module of a network entity (e.g., the WLAN radio module 520 of the base station 500 in FIG. 5). The method 900 may involve, at 910, receiving information regarding at least one of a MTU, an RTS threshold, uplink radio link conditions, and whether frame aggregation is configured. Block 910 may be performed by the RX component 524 of the WLAN radio module 520. The method 900 may involve, at 920, selecting a payload size to transmit based at least in part on the received information. Block 920 may be performed by the processor 526 of the WLAN radio module 520.

Figure 10A:
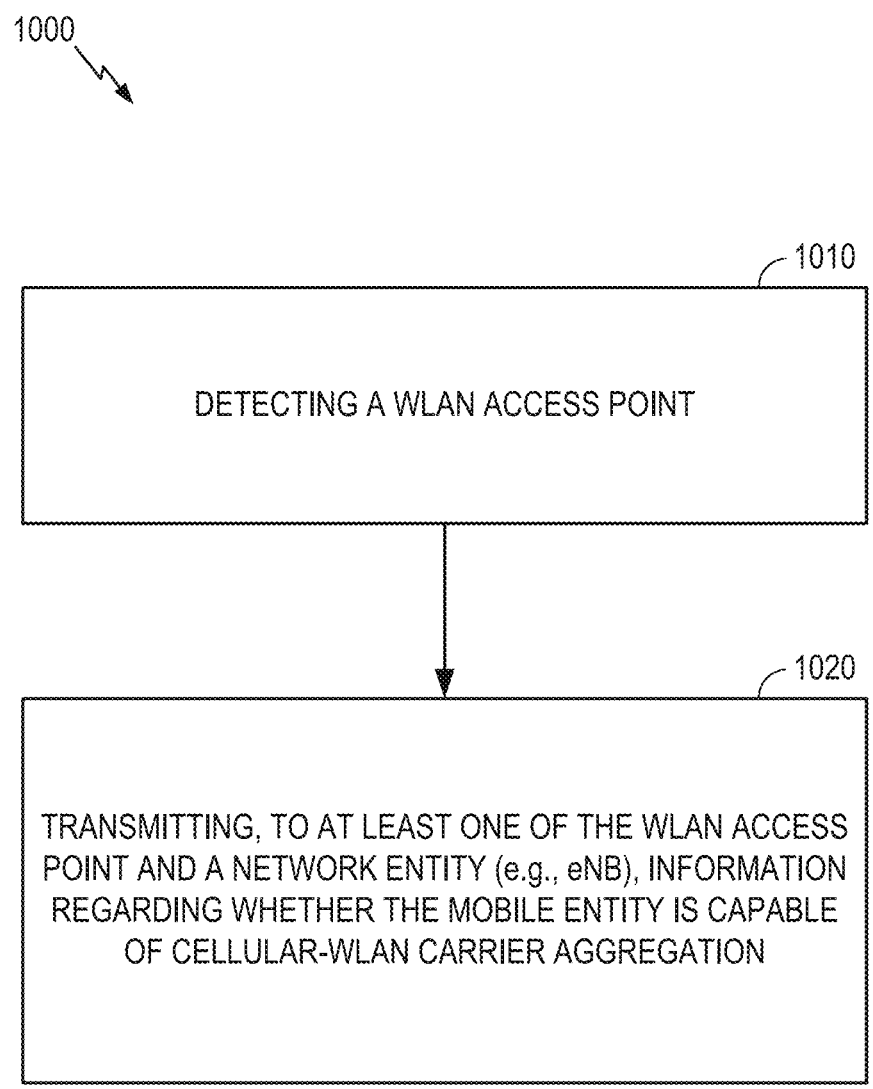
FIGS. 10A-B illustrate another carrier aggregation methodology operable by a mobile device.

With reference to FIG. 10A, illustrated is a methodology 1000 that may be performed by a mobile entity, such as, for example, the cellular radio module 610 of the mobile device 600 in FIG. 6. The method 1000 may involve, at 1010, detecting a WLAN AP. Block 1010 may be performed by the RX component 624 of the WLAN radio module 620. The method 1000 may involve, at 1020, transmitting, to at least one of the WLAN AP and a network entity (e.g., eNB), information regarding whether the mobile entity is capable of cellular-WLAN carrier aggregation. Block 1020 may be performed by the TX component 622 of the WLAN radio module 620 and the TX component 612 of the cellular radio module 610.

Figure 10B:
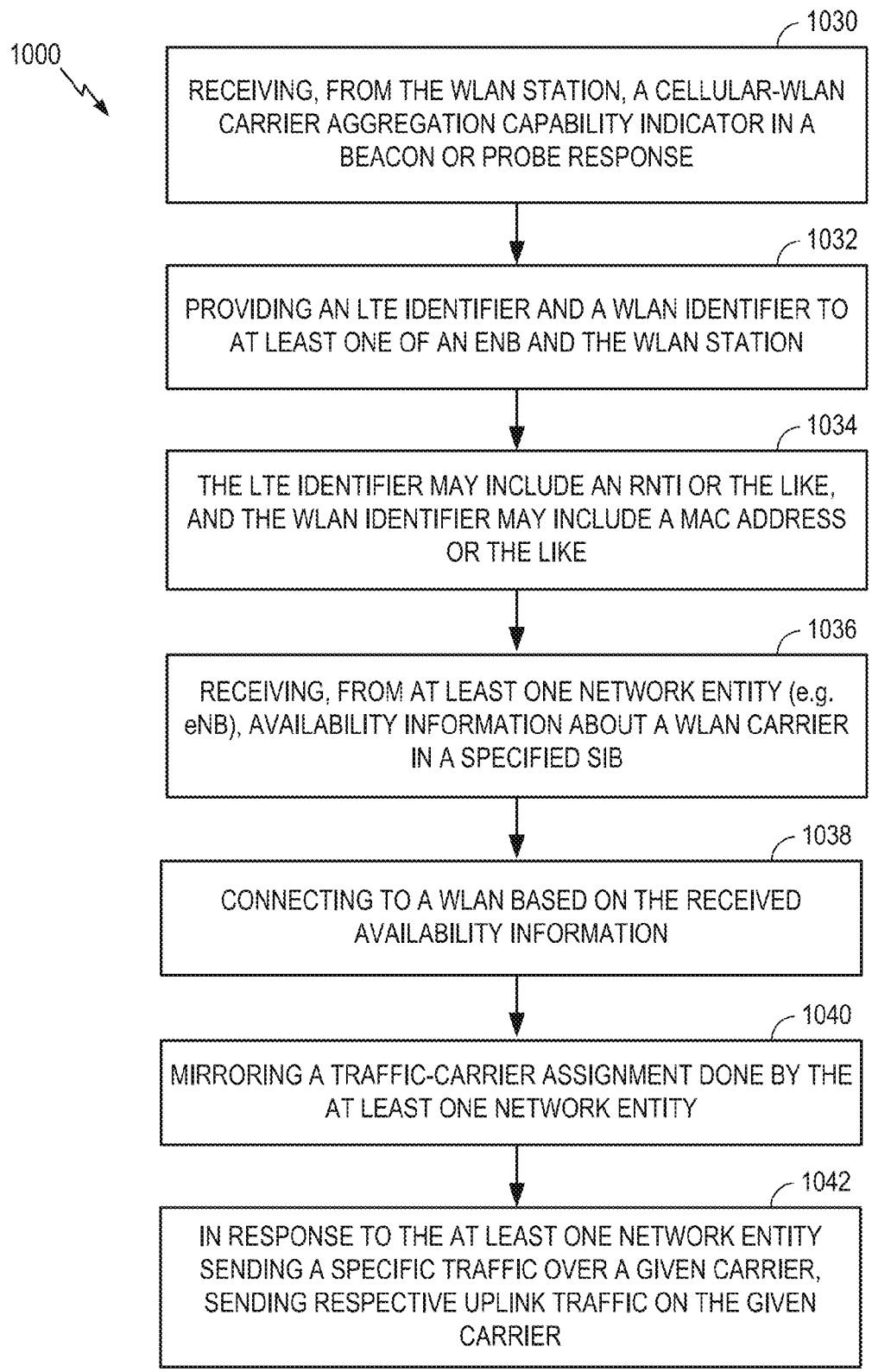

With reference to FIG. 10B, there are shown further operations or aspects of method 1000 that are optional are not required to perform the method 1000. If the method 1000 includes at least one block of FIG. 10B, then the method 1000 may terminate after the at least one block, without necessarily having to include any subsequent downstream block(s) that may be illustrated. For example, the method 1000 may further involve receiving, from the WLAN station, a cellular-WLAN carrier aggregation capability indicator in a beacon or probe response (block 1030).

The method 1000 may further involve providing an LTE identifier and a WLAN identifier to at least one of an eNB and the WLAN station (block 1032). The LTE identifier may include a radio network temporary identifier (RNTI) or the like, and the WLAN identifier may include a MAC address or the like (block 1034). The method 1000 may involve: receiving, from at least one network entity (e.g. an eNB), availability information about a WLAN carrier in a specified SIB (block 1036); and connecting to a WLAN based on the received availability information (block 1038). The method 1000 may further involve mirroring a traffic-carrier assignment done by the at least one network entity (block 1040). Block 1040 may include, in response to the at least one network entity sending a specific traffic over a given carrier, sending respective uplink traffic on the given carrier (block 1042).

Figure 11A:
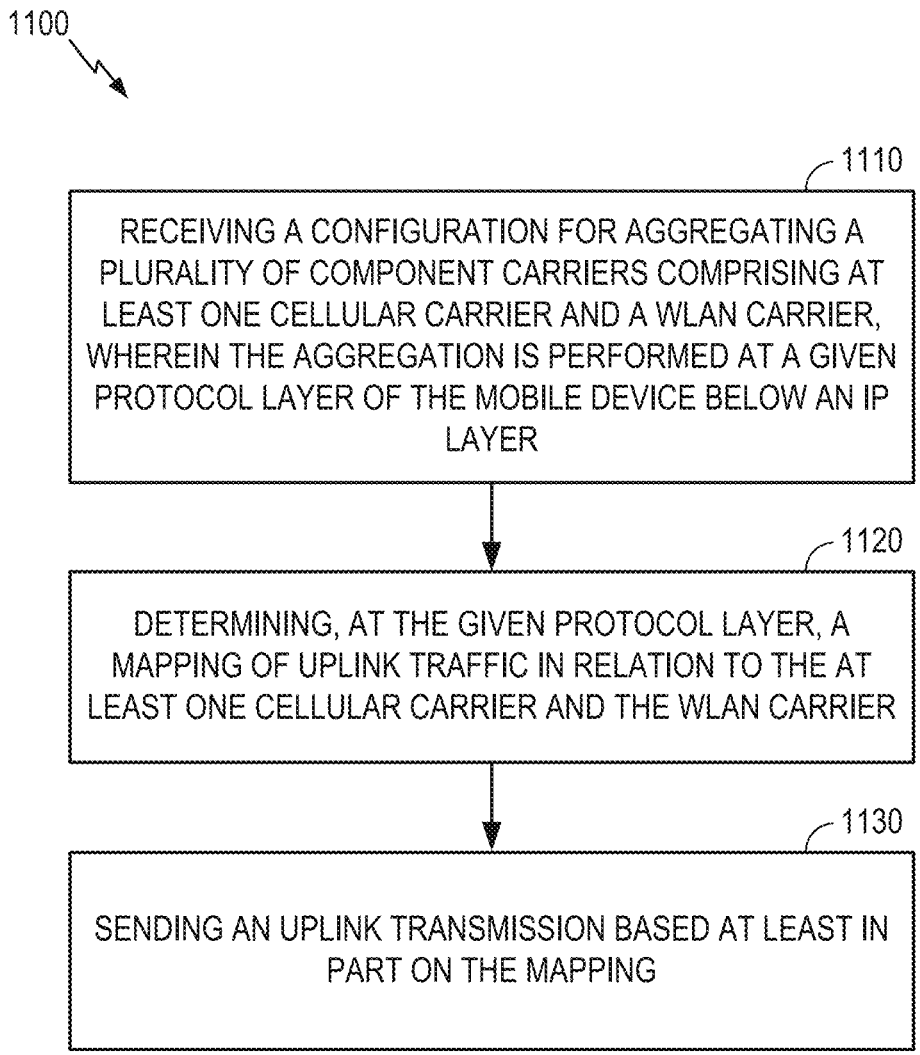
FIGS. 11A-E illustrate an example carrier aggregation methodology, operable by a mobile device, involving determining a mapping of traffic in relation to heterogeneous component carriers.
Figure 11B:
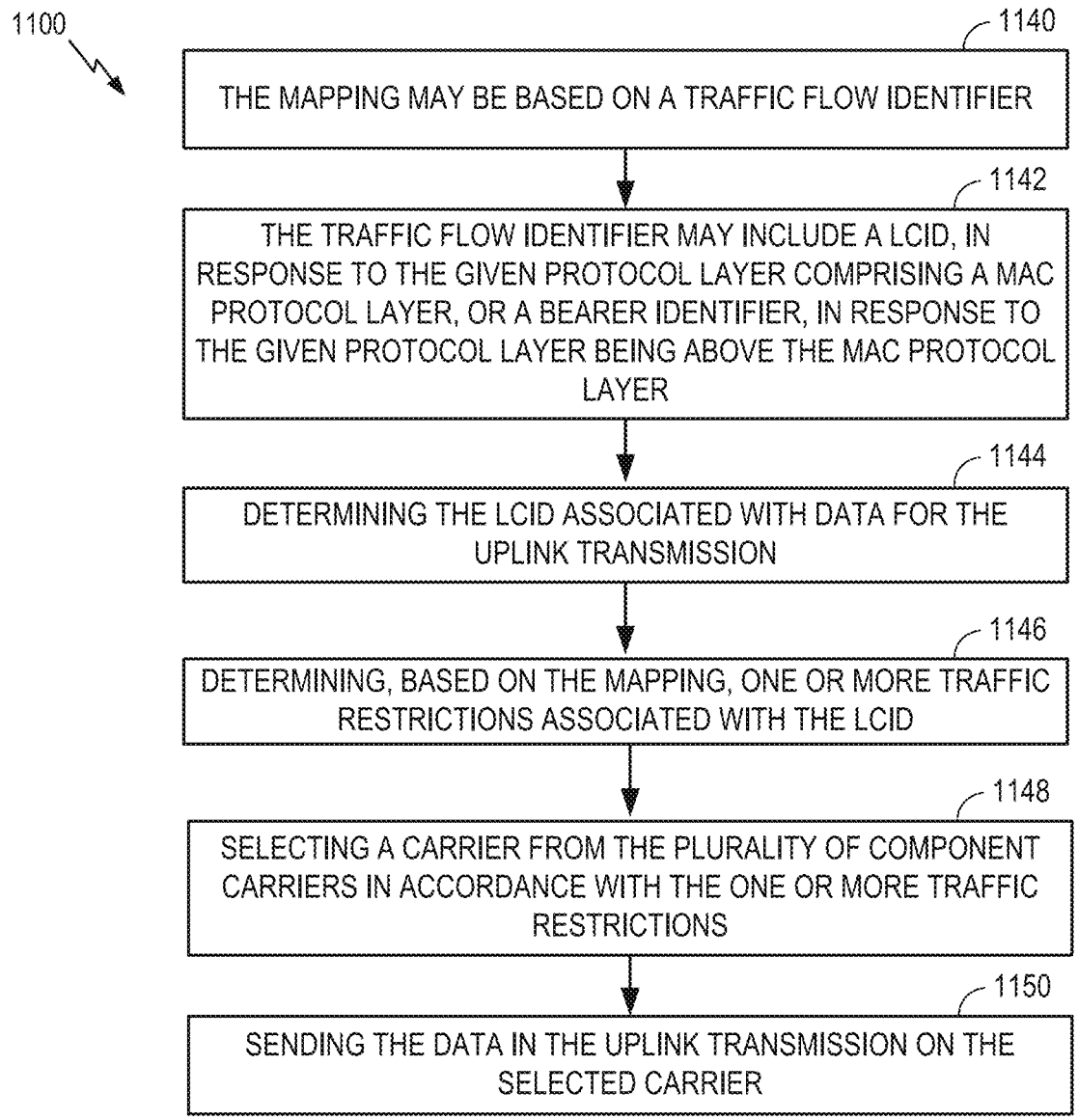

With reference to FIG. 11A, illustrated is an example methodology 1100, performed by the mobile device 600, involving determining a mapping of uplink traffic in relation to heterogeneous component carriers. The method 1100 may involve, at 1110, receiving a configuration for aggregating a plurality of component carriers comprising at least one cellular carrier and a WLAN carrier, wherein the aggregation is performed at a given protocol layer of the mobile device below an IP layer. Block 1110 may be performed by the RX component 614 of the cellular radio module 610. The method 1100 may involve, at 1120, determining, at the given protocol layer, a mapping of uplink traffic in relation to the at least one cellular carrier and the WLAN carrier. Block 1120 may be performed by the processor 616 of the cellular radio module 610 and/or the controller 630. The method 1100 may involve, at 1130, sending an uplink transmission based at least in part on the mapping. If the mapping indicates that the uplink traffic is be sent on the at least one WLAN carrier, the block 1030 may be performed by the TX component 622 of the WLAN radio module 620. In addition, the HARQ component 618 of the cellular radio module 610 may disable the HARQ operation, thereby facilitating WWAN-WLAN aggregation in view of the differences in how the WWAN and WLAN handle data traffic. If the mapping indicates that the uplink traffic is be sent on the at least one WWAN carrier, the block 1030 may be performed by the TX component 612 of the cellular radio module 610. In addition, the HARQ component 618 of the cellular radio module 610 may enable or verify proper functioning of the HARQ operation.

With reference to FIGS. 11B-E and 12A-B, there are shown further operations or aspects of method 1100 that are optional are not required to perform the method 1100. If the method 1100 includes at least one block of FIGS. 11B-E and 12A-B, then the method 1100 may terminate after the at least one block, without necessarily having to include any subsequent downstream block(s) that may be illustrated. For example, the mapping may be based on a traffic flow identifier (block 1140). The traffic flow identifier may include a LCID, in response to the given protocol layer comprising a MAC protocol layer, or a bearer identifier, in response to the given protocol layer being above the MAC protocol layer (block 1142).

The method 1100 may further involve: determining the LCID associated with data for the uplink transmission (block 1144); determining, based on the mapping, one or more traffic restrictions associated with the LCID (block 1146); selecting a carrier from the plurality of component carriers in accordance with the one or more traffic restrictions (block 1148); and sending the data in the uplink transmission on the selected carrier (block 1150).

Figure 11C:
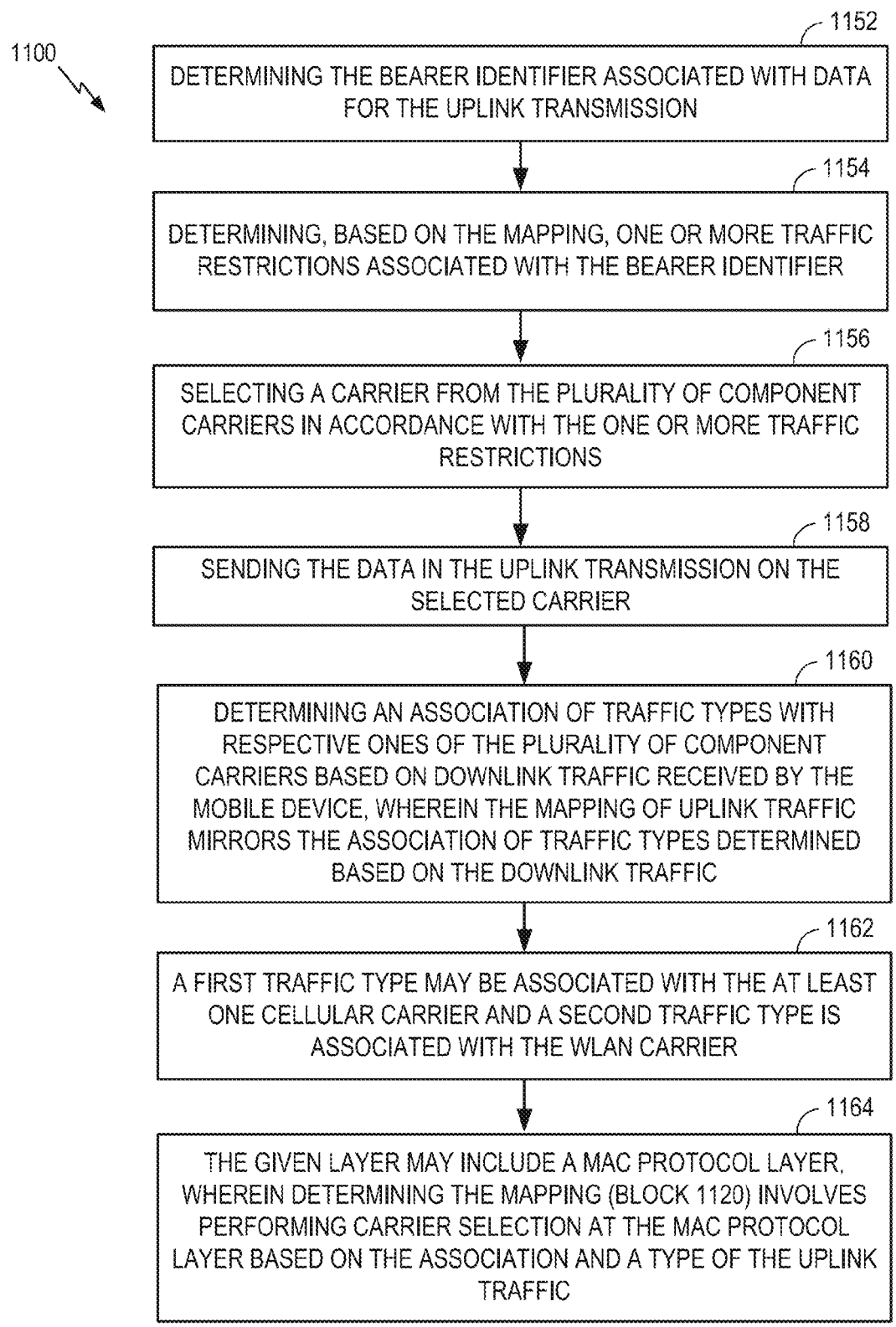

With reference to FIG. 11C, the method 1100 may involve: determining the bearer identifier associated with data for the uplink transmission (block 1152); determining, based on the mapping, one or more traffic restrictions associated with the bearer identifier (block 1154); selecting a carrier from the plurality of component carriers in accordance with the one or more traffic restrictions (block 1156); and sending the data in the uplink transmission on the selected carrier (block 1158).

The method 1100 may involve: determining an association of traffic types with respective ones of the plurality of component carriers based on downlink traffic received by the mobile device, wherein the mapping of uplink traffic mirrors the association of traffic types determined based on the downlink traffic (block 1160). Block 1160 may be performed by the processor 616 of the cellular radio module 610, the processor 626 of the WLAN radio module 620, and/or the controller 630. A first traffic type may be associated with the at least one cellular carrier and a second traffic type is associated with the WLAN carrier (block 1162). The given layer may include a MAC protocol layer, wherein determining the mapping (block 1120) may involve performing carrier selection at the MAC protocol layer based on the association and a type of the uplink traffic (block 1164).

Figure 11D:
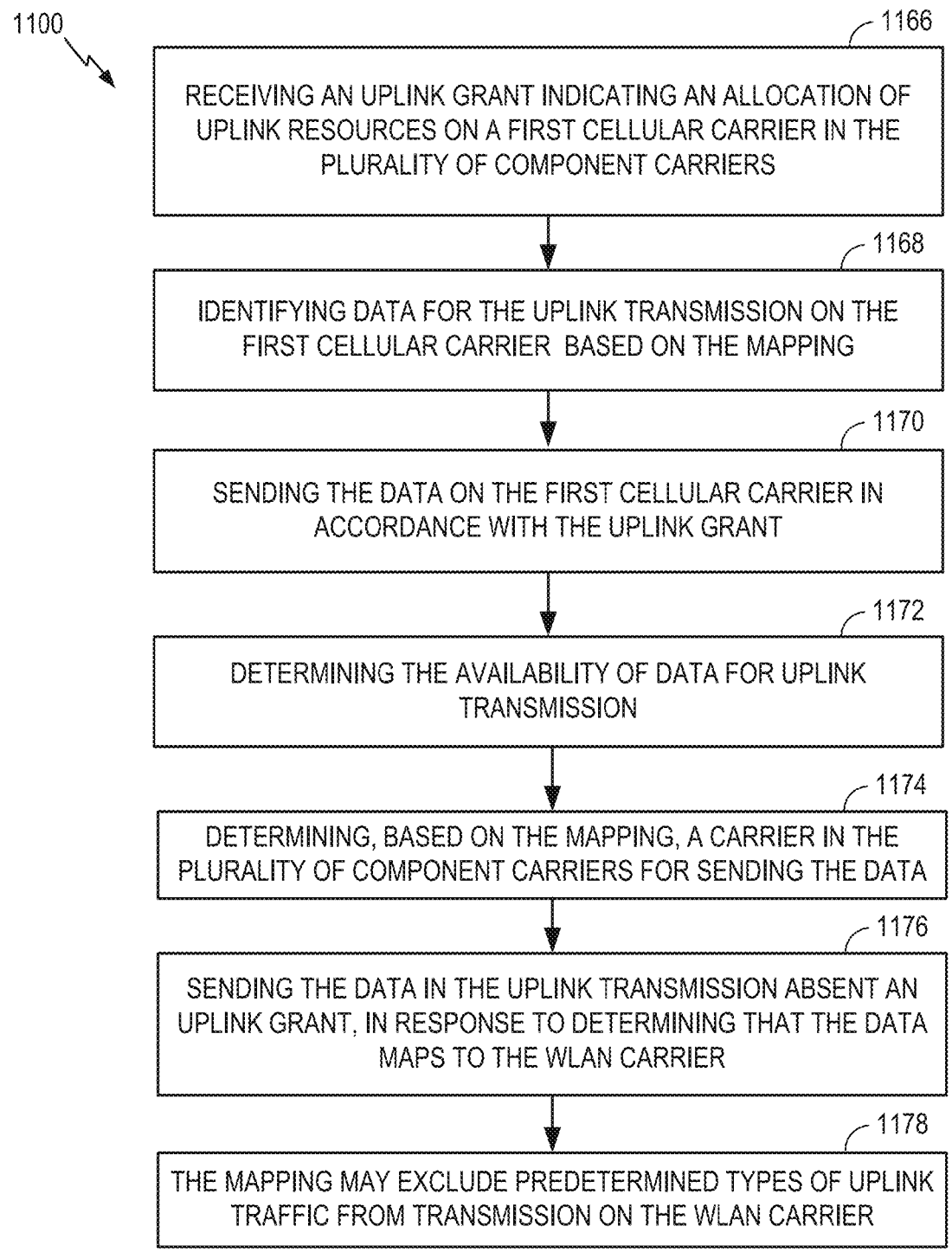

With reference to FIG. 11D, the method 1100 may involve: receiving an uplink grant indicating an allocation of uplink resources on a first cellular carrier in the plurality of component carriers (block 1166); identifying data for the uplink transmission on the first cellular carrier based on the mapping (block 1168); and sending the data on the first cellular carrier in accordance with the uplink grant (block 1170).

The method 1100 may involve: determining the availability of data for uplink transmission (block 1172); determining, based on the mapping, a carrier in the plurality of component carriers for sending the data (block 1174); and sending the data in the uplink transmission absent an uplink grant, in response to determining that the data maps to the WLAN carrier (block 1176). The mapping may exclude predetermined types of uplink traffic from transmission on the WLAN carrier (block 1178).

Figure 11E:
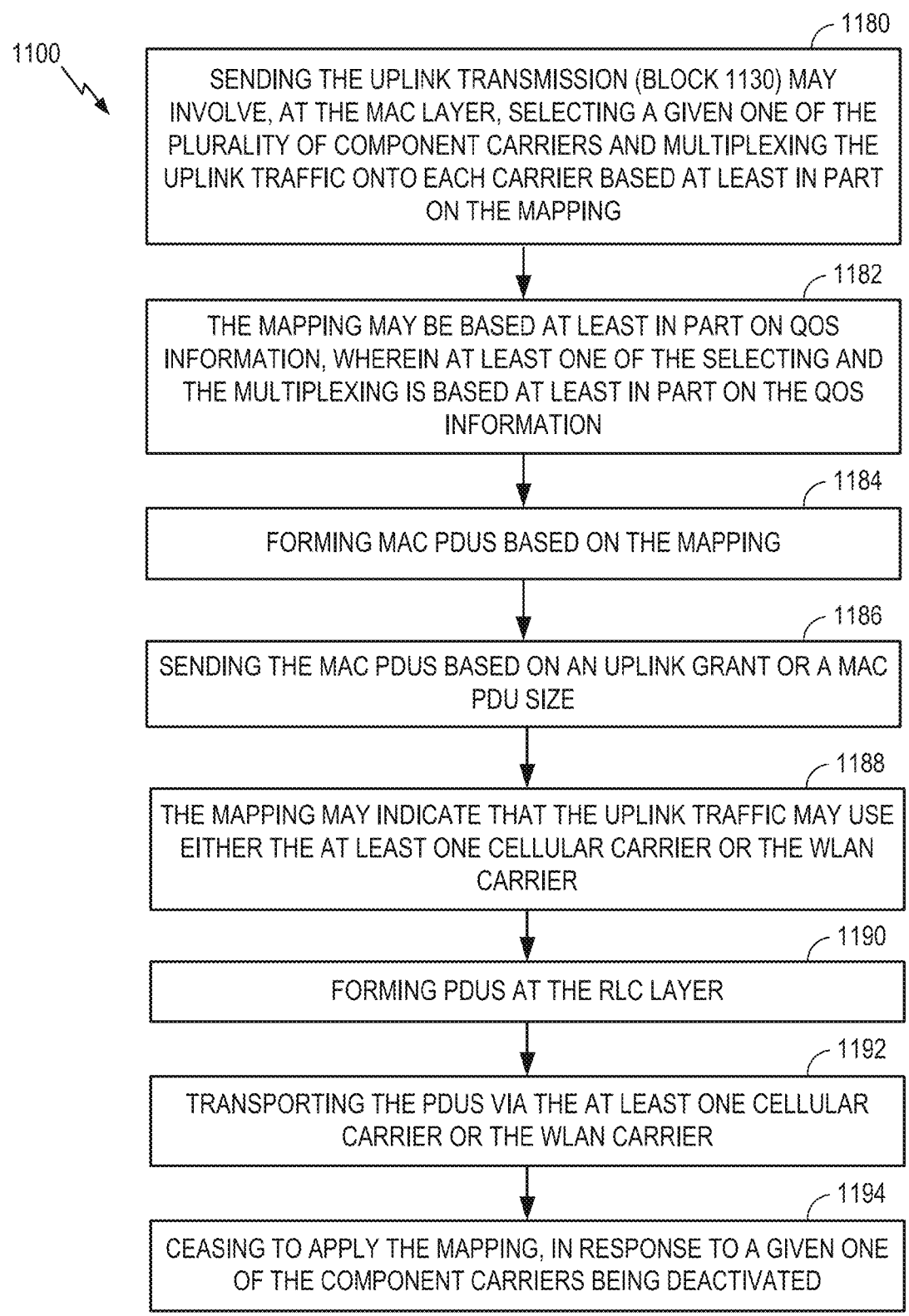

With reference to FIG. 11E, sending the uplink transmission (block 1130) may involve, at the MAC layer, selecting a given one of the plurality of component carriers and multiplexing the uplink traffic onto each carrier based at least in part on the mapping (block 1180). The mapping may be based at least in part on QoS information, wherein at least one of the selecting and the multiplexing is based at least in part on the QoS information (block 1182).

The aggregation may be performed at the MAC layer, and the method 1100 may involve: forming MAC PDUs based on the mapping (block 1184), and sending the MAC PDUs based on an uplink grant or a MAC PDU size (block 1186).

The mapping may indicate that the uplink traffic may use either the at least one cellular carrier or the WLAN carrier (block 1188). The aggregation may be performed at the MAC layer, and the method 1100 may involve: forming PDUs at the RLC layer (block 1190); and transporting the PDUs via the at least one cellular carrier or the WLAN carrier (block 1192). The method 1100 may further involve ceasing to apply the mapping, in response to a given one of the component carriers being deactivated (block 1194).

Figure 12A:
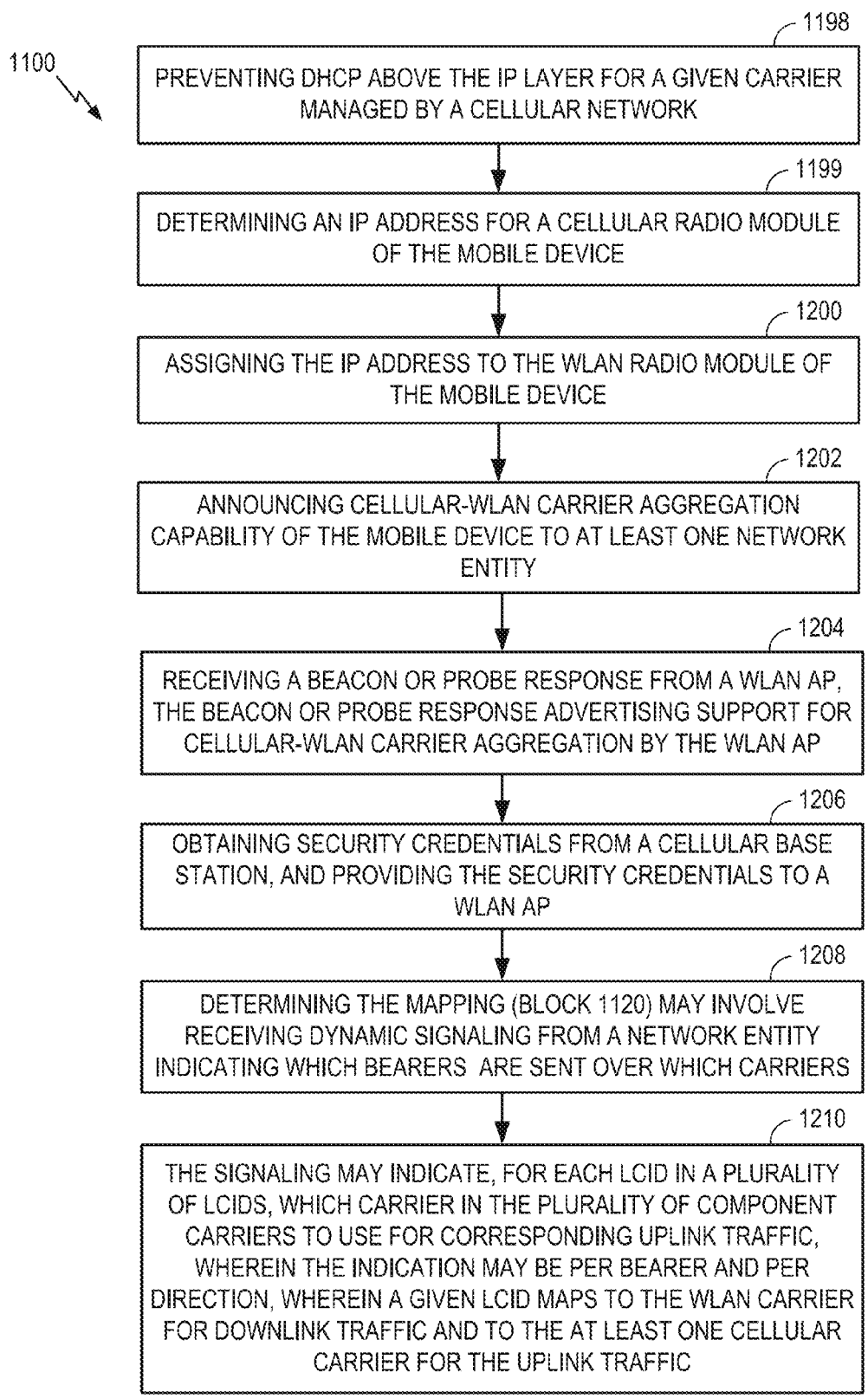
FIGS. 12A-B illustrate further aspects of the example carrier aggregation methodology of FIG. 11A.

With reference to FIG. 12A, the method 1100 may further involve: preventing DHCP above the IP layer for a given carrier managed by a cellular network (block 1198); determining an IP address for a cellular radio module of the mobile device (block 1199); and assigning the IP address to the WLAN radio module of the mobile device (block 1200).

The method 1100 may further involve announcing cellular-WLAN carrier aggregation capability of the mobile device to at least one network entity (block 1202). The method 1100 may further involve receiving a beacon or probe response from a WLAN AP, the beacon or probe response advertising support for cellular-WLAN carrier aggregation by the WLAN AP (block 1204). The method 1100 may further involve obtaining security credentials from a cellular base station, and providing the security credentials to a WLAN AP (block 1206).

Determining the mapping (block 1120) may involve receiving dynamic signaling from a network entity indicating which bearers are sent over which carriers (block 1208). The signaling may indicate, for each LCID in a plurality of LCIDs, which carrier in the plurality of component carriers to use for corresponding uplink traffic, wherein the indication may be per bearer and per direction, wherein a given LCID maps to the WLAN carrier for downlink traffic and to the at least one cellular carrier for the uplink traffic (block 1210).

Figure 12B:
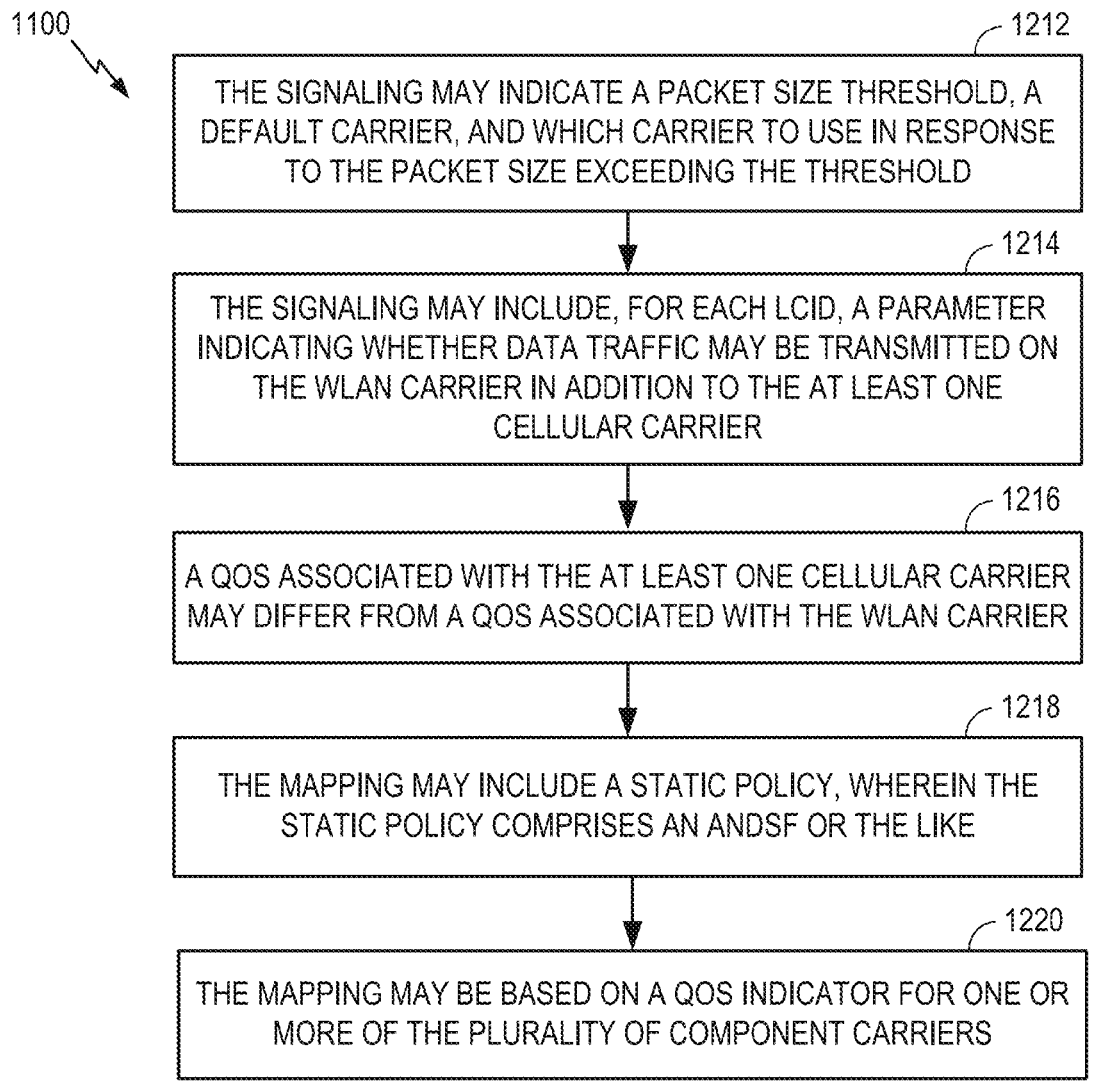

With reference to FIG. 12B, the signaling may indicate a packet size threshold, a default carrier, and which carrier to use in response to the packet size exceeding the threshold (block 1212). The signaling may include, for each LCID, a parameter indicating whether data traffic may be transmitted on the WLAN carrier in addition to the at least one cellular carrier (block 1214).

A QoS associated with the at least one cellular carrier may differ from a QoS associated with the WLAN carrier (block 1216). The mapping may include a static policy, wherein the static policy comprises an ANDSF or the like (block 1218). The mapping may be based on a QoS indicator for one or more of the plurality of component carriers (block 1220).

Figure 13A:
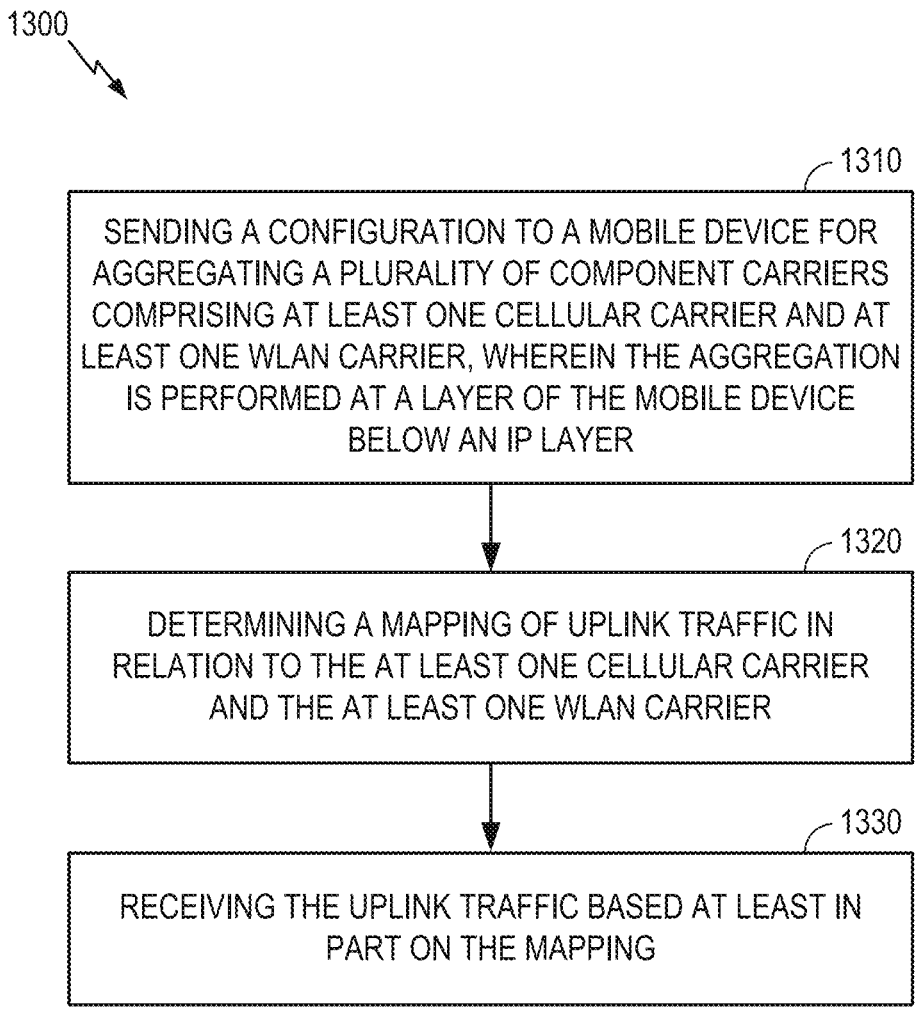
FIGS. 13A-D illustrate an example carrier aggregation methodology, operable by a network entity, involving determining a mapping of traffic in relation to heterogeneous component carriers.

With reference to FIG. 13A, illustrated is an example methodology 1300, performed by a network entity (e.g., the base station 500), involving determining a mapping of downlink and/or uplink traffic in relation to heterogeneous component carriers. The method 1300 may involve, at 1310, sending a configuration to a mobile device for aggregating a plurality of component carriers comprising at least one cellular carrier and at least one WLAN carrier, wherein the aggregation is performed at a layer of the mobile device below an IP layer. Block 1310 may be performed by the TX component 512 of the cellular radio module 510. The method 1300 may involve, at 1320, determining a mapping of uplink traffic in relation to the at least one cellular carrier and the at least one WLAN carrier. Block 1320 may be performed by the processor 516 of the cellular radio module 510 and/or the controller 530. The method 1300 may involve, at 1330, receiving the uplink traffic based at least in part on the mapping. If the mapping indicates that the uplink traffic is be sent on the at least one WLAN carrier, then the block 1330 may be performed by the RX component 524 of the WLAN radio module 520. In addition, the HARQ component 518 of the cellular radio module 510 may disable the HARQ operation, thereby facilitating WWAN-WLAN aggregation in view of the differences in how the WWAN and WLAN handle data traffic. If the mapping indicates that the uplink traffic is be sent on the cellular carrier, then the block 1330 may be performed by the RX component 514 of the cellular radio module 510. In addition, the HARQ component 518 of the cellular radio module 510 may enable or verify proper functioning of the HARQ operation.

Figure 13B:
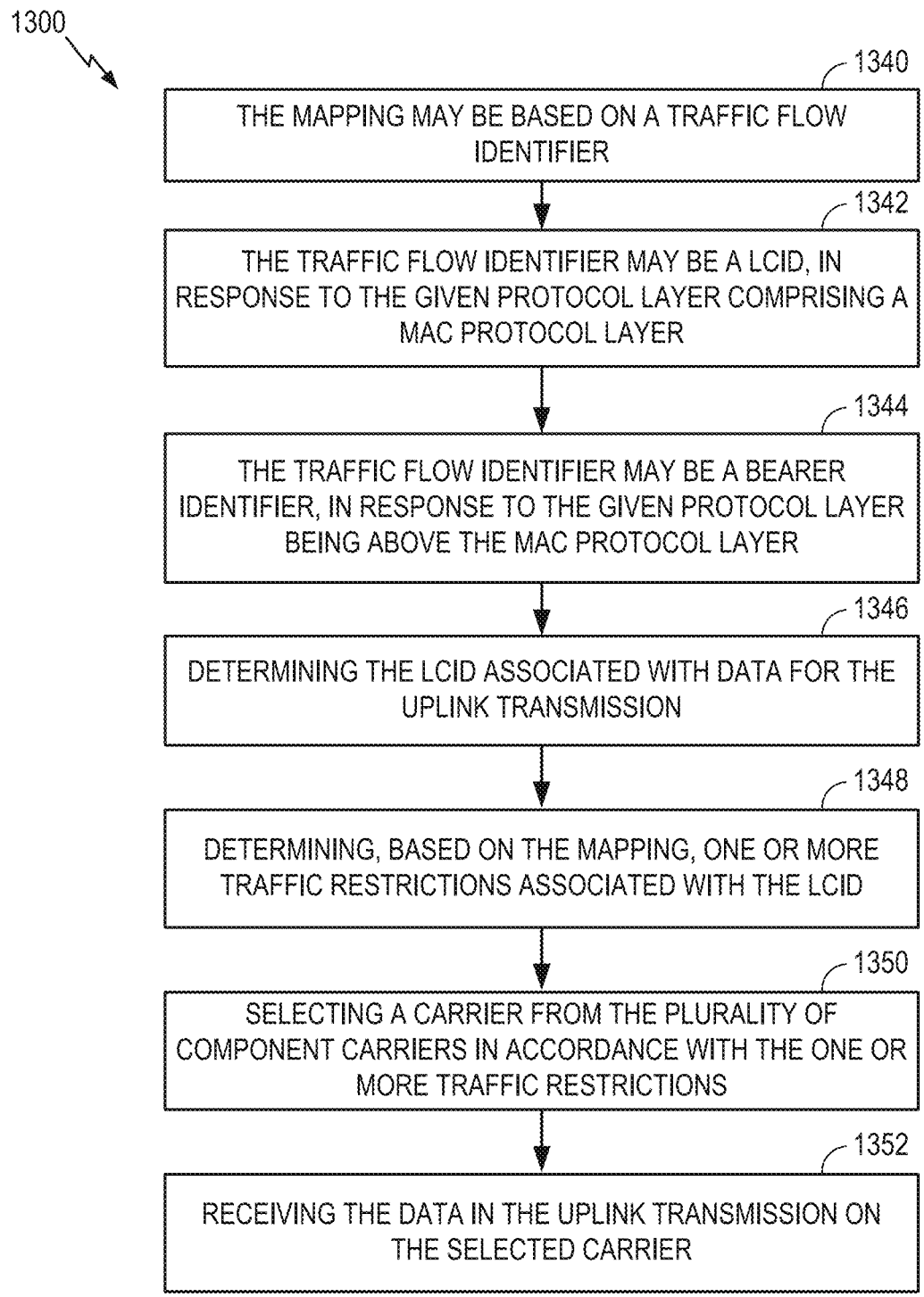
Figure 13C:
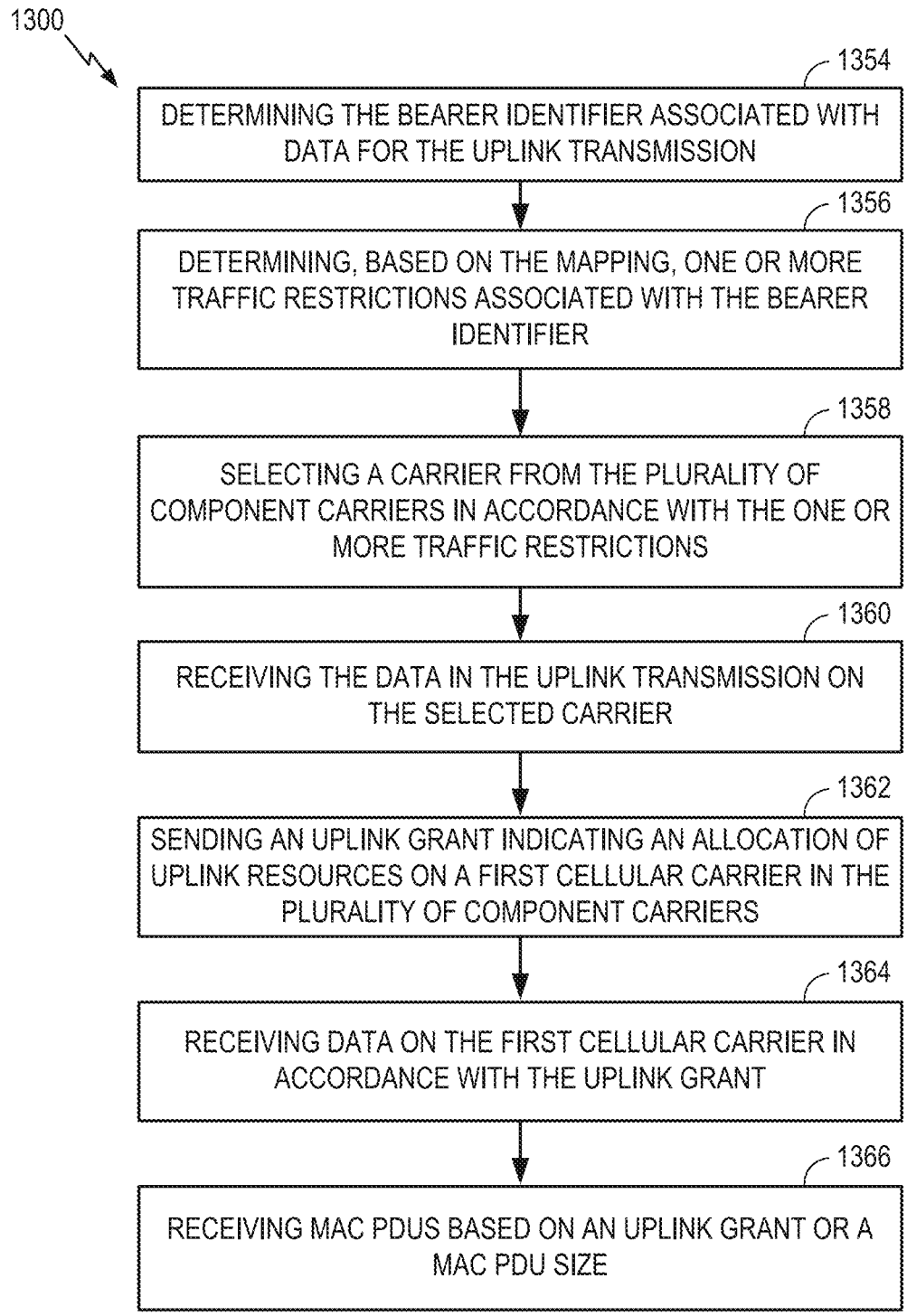
Figure 13D:
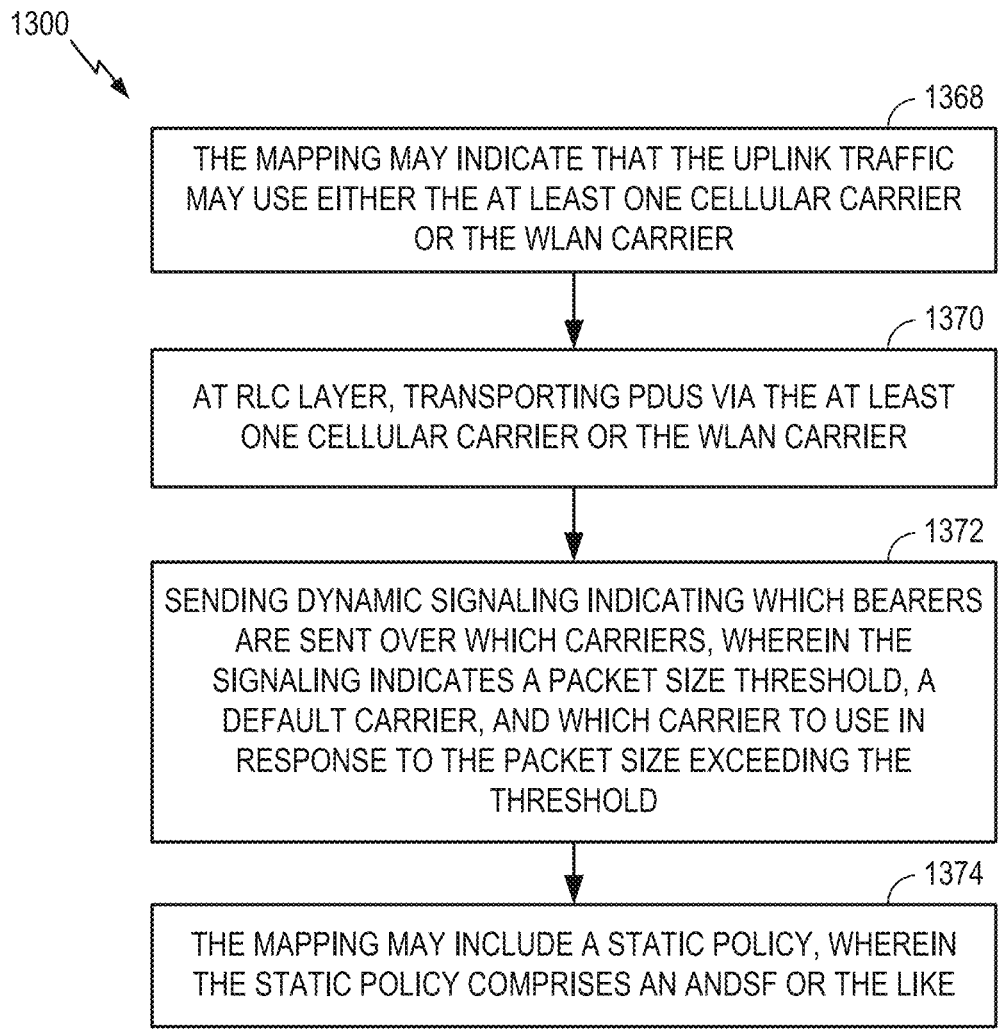

With reference to FIGS. 13B-D, there are shown further operations or aspects of method 1300 that are optional are not required to perform the method 1300. If the method 1300 includes at least one block of FIGS. 13B-D, then the method 1300 may terminate after the at least one block, without necessarily having to include any subsequent downstream block(s) that may be illustrated. For example, the mapping may be based on a traffic flow identifier (block 1340). The traffic flow identifier may be a LCID, in response to the given protocol layer comprising a MAC protocol layer (block 1342). The traffic flow identifier may be a bearer identifier, in response to the given protocol layer being above the MAC protocol layer (block 1344).

The method 1300 may involve: determining the LCID associated with data for the uplink transmission (block 1346); determining, based on the mapping, one or more traffic restrictions associated with the LCID (block 1348); selecting a carrier from the plurality of component carriers in accordance with the one or more traffic restrictions (block 1350); and receiving the data in the uplink transmission on the selected carrier (block 1352). Blocks 1346-1350 may be performed by the processor 516 of the cellular radio module 510, the processor 526 of the WLAN radio module 520, and/or the controller 530. Block 1352 may be performed by the RX component 514 of the cellular radio module 510, and/or the RX component 524 of the WLAN radio module 520.

With reference to FIG. 13C, the method 1300 may involve: determining the bearer identifier associated with data for the uplink transmission (block 1354); determining, based on the mapping, one or more traffic restrictions associated with the bearer identifier (block 1356); selecting a carrier from the plurality of component carriers in accordance with the one or more traffic restrictions (block 1358); and receiving the data in the uplink transmission on the selected carrier (block 1360). Blocks 1354-1358 may be performed by the processor 516 of the cellular radio module 510, the processor 526 of the WLAN radio module 520, and/or the controller 530. Block 1360 may be performed by the RX component 514 of the cellular radio module 510, and/or the RX component 524 of the WLAN radio module 520.

The method 1300 may involve: sending an uplink grant indicating an allocation of uplink resources on a first cellular carrier in the plurality of component carriers (block 1362); and receiving data on the first cellular carrier in accordance with the uplink grant (block 1364). The aggregation may be performed at the MAC layer, and the method 1300 may involve receiving MAC PDUs based on an uplink grant or a MAC PDU size (block 1366).

With reference to FIG. 13D, the mapping may indicate that the uplink traffic may use either the at least one cellular carrier or the WLAN carrier (block 1368). The aggregation is performed at the MAC layer, the method 1300 may involve, at RLC layer, transporting PDUs via the at least one cellular carrier or the WLAN carrier (block 1370).

The method 1300 may involve sending dynamic signaling indicating which bearers are sent over which carriers, wherein the signaling indicates a packet size threshold, a default carrier, and which carrier to use in response to the packet size exceeding the threshold (block 1372). The mapping may include a static policy, wherein the static policy comprises an ANDSF or the like (block 1374).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a mobile device, comprising:
   receiving a configuration for aggregating a plurality of component carriers comprising at least one cellular carrier and a wireless local area network (WLAN) carrier, wherein aggregation is performed at a given protocol layer of the mobile device below an internet protocol (IP) layer;
   determining, at the given protocol layer, a mapping of uplink traffic in relation to the at least one cellular carrier and the WLAN carrier, wherein the mapping is based on a traffic flow identifier;
   determining, based on the mapping, one or more traffic restrictions associated with the traffic flow identifier;
   selecting a carrier from the plurality of component carriers in accordance with the one or more traffic restrictions associated with the traffic flow identifier; and
   sending an uplink transmission on the selected carrier.

2. The method of claim 1, wherein the traffic flow identifier comprises one of:
   a logical channel identifier (LCID) when the given protocol layer comprises a media access control (MAC) protocol layer; or
   a bearer identifier when the given protocol layer comprises a protocol layer above the MAC protocol layer.

3. The method of claim 1, further comprising:
   determining a logical channel identifier (LCID) associated with data for the uplink transmission, wherein the traffic flow identifier comprises the LCID.

4. The method of claim 1, further comprising:
   determining a bearer identifier associated with data for the uplink transmission, wherein the traffic flow identifier comprises the bearer identifier.

5. The method of claim 1, further comprising:
   determining an association of traffic types with respective ones of the plurality of component carriers based on downlink traffic received by the mobile device;
   wherein the mapping of uplink traffic corresponds to the association of traffic types determined based on the downlink traffic.

6. The method of claim 5, wherein a first traffic type is associated with the at least one cellular carrier and a second traffic type is associated with the WLAN carrier.

7. The method of claim 6, wherein the given protocol layer comprises a media access control (MAC) protocol layer, and wherein determining the mapping comprises performing carrier selection at the MAC protocol layer based on the association and a type of the uplink traffic.

8. The method of claim 1, further comprising:
   receiving an uplink grant indicating an allocation of uplink resources on a first cellular carrier in the plurality of component carriers;
   identifying data for the uplink transmission on the first cellular carrier based on the mapping; and
   sending the data on the first cellular carrier in accordance with the uplink grant.

9. The method of claim 1, further comprising:
   determining an availability of data for the uplink transmission;
   determining that the data maps to the WLAN carrier; and
   sending the data in the uplink transmission absent an uplink grant based on determining that the data maps to the WLAN carrier.

10. The method of claim 1, wherein the mapping excludes predetermined types of uplink traffic from transmission on the WLAN carrier.

11. The method of claim 1, wherein sending the uplink transmission further comprises, at a media access control (MAC) layer, multiplexing the uplink traffic based at least in part on the mapping.

12. The method of claim 11,
wherein the mapping is based at least in part on Quality of Service (QoS) information, and
wherein the multiplexing is based at least in part on the QoS information.

13. The method of claim 1, wherein the aggregation is performed at a media access control (MAC) layer, the method further comprising:
forming MAC protocol data units (PDUs) based on the mapping; and
sending the MAC PDUs based on an uplink grant or a MAC PDU size.

14. The method of claim 1, wherein the mapping includes information that identifies that the uplink traffic may use either the at least one cellular carrier or the WLAN carrier.

15. The method of claim 1, wherein the aggregation is performed at a media access control (MAC) layer, the method further comprising:
forming protocol data units (PDUs) at a radio link control (RLC) layer; and
transporting the PDUs via the at least one cellular carrier or the WLAN carrier.

16. The method of claim 1, further comprising ceasing to apply the mapping based on deactivation of the selected carrier.

17. The method of claim 1, further comprising ceasing applying a Dynamic Host Configuration Protocol (DHCP) above the IP layer.

18. The method of claim 17, further comprising determining an IP address for a cellular radio module of the mobile device, and assigning the IP address to a WLAN radio module of the mobile device.

19. The method of claim 1, further comprising signaling a cellular-WLAN carrier aggregation capability of the mobile device to at least one network entity.

20. The method of claim 1, further comprising receiving a beacon or probe response from a WLAN access point (AP), the beacon or probe response advertising support for cellular-WLAN carrier aggregation by the WLAN AP.

21. The method of claim 1, further comprising obtaining security credentials from a cellular base station, and providing the security credentials to a WLAN access point (AP).

22. The method of claim 1, wherein determining the mapping is based on receiving dynamic signaling from a network entity indicating which bearers are sent over which carriers.

23. The method of claim 22, wherein the dynamic signaling provides an indication, for a logical channel identifier (LCID) of a plurality of LCIDs, of which carrier in the plurality of component carriers to use for corresponding uplink traffic.

24. The method of claim 23, wherein the indication is per bearer and per direction.

25. The method of claim 23, wherein the LCID maps to the WLAN carrier for downlink traffic and to the at least one cellular carrier for the uplink traffic.

26. The method of claim 22, wherein the dynamic signaling indicates a packet size threshold, a default carrier, and which carrier to use based on a packet size exceeding the packet size threshold.

27. The method of claim 22, wherein the dynamic signaling comprises, for a logical channel identifier (LCID), a parameter indicating whether data traffic may be transmitted on the WLAN carrier in addition to the at least one cellular carrier.

28. The method of claim 1, wherein the mapping comprises a static policy defined by a communications standard or configured by an operator of a base station.

29. The method of claim 1, wherein the mapping is based on a Quality of Service (QoS) indicator for one or more of the plurality of component carriers.

30. An apparatus, comprising:
means for receiving a configuration for aggregating a plurality of component carriers comprising at least one cellular carrier and a wireless local area network (WLAN) carrier, wherein aggregation is performed at a given protocol layer of the apparatus below an internet protocol (IP) layer;
means for determining, at the given protocol layer, a mapping of uplink traffic in relation to the at least one cellular carrier and the WLAN carrier, wherein the mapping is based on a traffic flow identifier;
means for determining, based on the mapping, one or more traffic restrictions associated with the traffic flow identifier;
means for selecting a carrier from the plurality of component carriers in accordance with the one or more traffic restrictions associated with the traffic flow identifier; and
means for sending an uplink transmission on the selected carrier.

31. The apparatus of claim 30, wherein the traffic flow identifier comprises:
a logical channel identifier (LCID), based on the given protocol layer comprising a media access control (MAC) protocol layer; or
a bearer identifier, based on the given protocol layer being above the MAC protocol layer.

32. The apparatus of claim 30, further comprising:
means for determining a logical channel identifier (LCID) associated with data for the uplink transmission; and
means for determining, based on the mapping, one or more traffic restrictions that are associated with, wherein the traffic flow identifier comprises the LCID.

33. The apparatus of claim 30, further comprising:
means for determining a bearer identifier associated with data for the uplink transmission, wherein the traffic flow identifier comprises the bearer identifier.

34. The apparatus of claim 30, further comprising:
means for determining an association of traffic types with respective ones of the plurality of component carriers based on downlink traffic received by the apparatus;
wherein the mapping of uplink traffic mirrors the association of traffic types determined based on the downlink traffic.

35. The apparatus of claim 30, wherein a first traffic type is associated with the at least one cellular carrier and a second traffic type is associated with the WLAN carrier.

36. The apparatus of claim 30, wherein the given protocol layer comprises a media access control (MAC) protocol layer, further comprising means for performing carrier selection at the MAC protocol layer based on the association and a type of the uplink traffic.

37. The apparatus of claim 30, further comprising:
means for receiving an uplink grant indicating an allocation of uplink resources on a first cellular carrier in the plurality of component carriers;

means for identifying data for the uplink transmission on the first cellular carrier based on the mapping; and means for sending the data on the first cellular carrier in accordance with the uplink grant.

38. The apparatus of claim 30, further comprising:

means for determining an availability of data for the uplink transmission;

means for determining that the data maps to the WLAN carrier; and means for sending the data in the uplink transmission absent an uplink grant, based on determining that the data maps to the WLAN carrier.

39. The apparatus of claim 30, wherein the mapping excludes predetermined types of uplink traffic from transmission on the WLAN carrier.

40. The apparatus of claim 30, further comprising means for multiplexing the uplink traffic based at least in part on the mapping.

41. The apparatus of claim 40, wherein the mapping is based at least in part on Quality of Service (QoS) information, and wherein the means for multiplexing is based at least in part on the QoS information.

42. The apparatus of claim 30, wherein the aggregation is performed at a media access control (MAC) layer, the apparatus further comprising:

means for forming MAC protocol data units (PDUs) based on the mapping; and means for sending the MAC PDUs based on an uplink grant or a MAC PDU size.

43. The apparatus of claim 30, wherein the mapping includes information that identifies that the uplink traffic may use either the at least one cellular carrier or the WLAN carrier.

44. The apparatus of claim 30, wherein the aggregation is performed at a media access control (MAC) layer, the apparatus further comprising:

means for forming protocol data units (PDUs) at a radio link control (RLC) layer; and means for transporting the PDUs via the at least one cellular carrier or the WLAN carrier.

45. The apparatus of claim 30, further comprising means for ceasing to apply the mapping based on deactivation of the selected carrier.

46. The apparatus of claim 30, further comprising means for ceasing to apply a Dynamic Host Configuration Protocol (DHCP) above the IP layer.

47. The apparatus of claim 30, further comprising means for determining an IP address for a cellular radio module of the apparatus, and means for assigning the IP address to a WLAN radio module of the apparatus.

48. The apparatus of claim 30, further comprising means for signaling a cellular-WLAN carrier aggregation capability of the apparatus to at least one network entity.

49. The apparatus of claim 30, further comprising means for receiving a beacon or probe response from a WLAN access point (AP), the beacon or probe response advertising support for cellular-WLAN carrier aggregation by the WLAN AP.

50. The apparatus of claim 30, further comprising means for obtaining security credentials from a cellular base station, and means for providing the security credentials to a WLAN access point (AP).

51. The apparatus of claim 30, further comprising means for receiving dynamic signaling from a network entity indicating which bearers are sent over which carriers.

52. The apparatus of claim 51, wherein the dynamic signaling provides an indication, for a logical channel identifier (LCID) of a plurality of LCIDs, of which carrier in the plurality of component carriers to use for corresponding uplink traffic.

53. The apparatus of claim 52, wherein the indication is per bearer and per direction.

54. The apparatus of claim 52, wherein the LCID maps to the WLAN carrier for downlink traffic and to the at least one cellular carrier for the uplink traffic.

55. The apparatus of claim 51, wherein the dynamic signaling indicates a packet size threshold, a default carrier, and which carrier to use based on a packet size exceeding the threshold.

56. The apparatus of claim 51, wherein the dynamic signaling comprises, for a logical channel identifier (LCID), a parameter indicating whether data traffic may be transmitted on the WLAN carrier in addition to the at least one cellular carrier.

57. The apparatus of claim 30, wherein the mapping comprises a static policy.

58. The apparatus of claim 30, wherein the mapping is based on a Quality of Service (QoS) indicator for one or more of the plurality of component carriers.

59. An apparatus, comprising:

at least one radio frequency (RF) transceiver configured to receive a configuration for aggregating a plurality of component carriers comprising at least one cellular carrier and a wireless local area network (WLAN) carrier, wherein aggregation is performed at a given protocol layer of the apparatus below an internet protocol (IP) layer;

at least one processor configured to:

determine, at the given protocol layer, a mapping of uplink traffic in relation to the at least one cellular carrier and the WLAN carrier, wherein the mapping is based on a traffic flow identifier;

determine, based on the mapping, one or more traffic restrictions associated with the traffic flow identifier;

select a carrier from the plurality of component carriers in accordance with the one or more traffic restrictions associated with the traffic flow identifier; and instruct the RF transceiver to send an uplink transmission on the selected carrier; and a memory coupled to the at least one processor for storing data.

60. The apparatus of claim 59, wherein the traffic flow identifier comprises:

a logical channel identifier (LCID), based on the given protocol layer comprising a media access control (MAC) protocol layer; or a bearer identifier, based on the given protocol layer being above the MAC protocol layer.

61. The apparatus of claim 59, wherein:

the at least one processor is further configured to determine an association of traffic types with respective ones of the plurality of component carriers based on downlink traffic received by the apparatus; and the mapping of uplink traffic mirrors the association of traffic types determined based on the downlink traffic.

62. A non-transitory computer-readable medium storing instructions, the instructions comprising: one or more instructions that, when executed by a processor, cause the processor to:

receive a configuration for aggregating a plurality of component carriers comprising at least one cellular carrier and a wireless local area network (WLAN)

carrier, wherein aggregation is performed at a given protocol layer of the below an internet protocol (IP) layer;

determine, at the given protocol layer, a mapping of uplink traffic in relation to the at least one cellular carrier and the WLAN carrier, wherein the mapping is based on a traffic flow identifier;

determine, based on the mapping, one or more traffic restrictions associated with the traffic flow identifier;

select a carrier from the plurality of component carriers in accordance with the one or more traffic restrictions associated with the traffic flow identifier; and send an uplink transmission on the selected carrier.

63. The non-transitory computer-readable medium of claim 62, wherein the traffic flow identifier comprises:
a logical channel identifier (LCID), based on the given protocol layer comprising a media access control (MAC) protocol layer; or
a bearer identifier, based on the given protocol layer being above the MAC protocol layer.

64. The non-transitory computer-readable medium of claim 62, wherein:
the instructions further comprise one or more instructions to cause the processor to determine an association of traffic types with respective ones of the plurality of component carriers based on downlink traffic; and
the mapping of uplink traffic mirrors the association of traffic types determined based on the downlink traffic.

65. The non-transitory computer-readable medium of claim 62, wherein the instructions further comprise:
one or more instructions that, when executed by the processor, cause the processor to:
receive an uplink grant indicating an allocation of uplink resources on a first cellular carrier in the plurality of component carriers;
identify data for the uplink transmission on the first cellular carrier based on the mapping; and
send the data on the first cellular carrier in accordance with the uplink grant.

66. The non-transitory computer-readable medium of claim 62, wherein the instructions further comprise:
one or more instructions that, when executed by the processor, cause the processor to:
determine an availability of data for the uplink transmission;
determine that the data maps to the WLAN carrier; and
send the data in the uplink transmission absent an uplink grant based on determining that the data maps to the WLAN carrier.

67. The non-transitory computer-readable medium of claim 62, wherein the mapping excludes predetermined types of uplink traffic from transmission on the WLAN carrier.

68. The non-transitory computer-readable medium of claim 62, wherein the mapping is further based on Quality of Service (QoS) information.

69. The non-transitory computer-readable medium of claim 62,
wherein the aggregation is performed at a media access control (MAC) layer, and
where the instructions further comprise:
one or more instructions that, when executed by the processor, cause the processor to:
form MAC protocol data units (PDUs) based on the mapping; and
send the MAC PDUs based on an uplink grant or a MAC PDU size.

70. A method operable by a network entity, comprising:
sending a configuration to a mobile device for aggregating a plurality of component carriers comprising at least one cellular carrier and at least one wireless local area network (WLAN) carrier, wherein aggregation is performed at a layer of the mobile device below an internet protocol (IP) layer;
determining a mapping of uplink traffic in relation to the at least one cellular carrier and the at least one WLAN carrier, wherein the mapping is based on a traffic flow identifier;
determining, based on the mapping, one or more traffic restrictions associated with the traffic flow identifier;
selecting a carrier from the plurality of component carriers in accordance with the one or more traffic restrictions associated with the traffic flow identifier; and
receiving the uplink traffic on the selected carrier.

71. The method of claim 70, wherein the traffic flow identifier comprises:
a logical channel identifier (LCID), based on the protocol layer comprising a media access control (MAC) protocol layer; or
a bearer identifier, based on the protocol layer being above the MAC protocol layer.

72. The method of claim 70, further comprising:
determining a logical channel identifier (LCID) associated with data for the uplink traffic, wherein the traffic flow identifier comprises the LCID.

73. The method of claim 70, further comprising:
determining a bearer identifier associated with data for the uplink traffic, wherein the traffic flow identifier comprises the bearer identifier.

74. An apparatus, comprising:
means for sending a configuration to a mobile device for aggregating a plurality of component carriers comprising at least one cellular carrier and at least one wireless local area network (WLAN) carrier, wherein aggregation is performed at a layer of the mobile device below an internet protocol (IP) layer;
means for determining a mapping of uplink traffic in relation to the at least one cellular carrier and the at least one WLAN carrier, wherein the mapping is based on a traffic flow identifier;
means for determining, based on the mapping, one or more traffic restrictions associated with the traffic flow identifier;
means for selecting a carrier from the plurality of component carriers in accordance with the one or more traffic restrictions associated with the traffic flow identifier; and
means for receiving the uplink traffic on the selected carrier.

75. The apparatus of claim 74, wherein the traffic flow identifier comprises:
a logical channel identifier (LCID), based on the protocol layer comprising a media access control (MAC) protocol layer; or
a bearer identifier, based on the protocol layer being above the MAC protocol layer.

76. The apparatus of claim 74, further comprising:
means for determining a logical channel identifier (LCID) associated with data for the uplink traffic, wherein the traffic flow identifier comprises the LCID.

77. The apparatus of claim 74, further comprising:
means for determining a bearer identifier associated with data for the uplink traffic, wherein the traffic flow identifier comprises the bearer identifier.

78. An apparatus, comprising:
- at least one radio frequency (RF) transceiver configured to send a configuration to a mobile device for aggregating a plurality of component carriers comprising at least one cellular carrier and at least one wireless local area network (WLAN) carrier, wherein aggregation is performed at a layer of the mobile device below an internet protocol (IP) layer;
- at least one processor configured to:
- determine a mapping of uplink traffic in relation to the at least one cellular carrier and the at least one WLAN carrier, wherein the mapping is based on a traffic flow identifier;
- determine, based on the mapping, one or more traffic restrictions associated with the traffic flow identifier; and
- select a carrier from the plurality of component carriers in accordance with the one or more traffic restrictions associated with the traffic flow identifier; and
- a memory coupled to the at least one processor for storing data;
- wherein the at least one RF transceiver receives the uplink traffic on the selected carrier.

79. The apparatus of claim 78, wherein the traffic flow identifier comprises:
- a logical channel identifier (LCID), based on the protocol layer comprising a media access control (MAC) protocol layer; or
- a bearer identifier, based on the protocol layer being above the MAC protocol layer.

80. The apparatus of claim 78,
- wherein the at least one processor is further configured to:
- determine a logical channel identifier (LCID) associated with data for the uplink traffic; and
- wherein the traffic flow identifier comprises the LCID.

81. The apparatus of claim 78,
- wherein the at least one processor is further configured to:
- determine a bearer identifier associated with data for the uplink traffic; and
- wherein the traffic flow identifier comprises the bearer identifier.

82. A non-transitory computer-readable medium storing instructions, the instructions comprising:
- one or more instructions that, when executed by a processor, cause the processor to:
- send a configuration to a mobile device for aggregating a plurality of component carriers comprising at least one cellular carrier and at least one wireless local area network (WLAN) carrier, wherein aggregation is performed at a layer of the mobile device below an internet protocol (IP) layer;
- determine a mapping of uplink traffic in relation to the at least one cellular carrier and the at least one WLAN carrier, wherein the mapping is based on a traffic flow identifier;
- determine, based on the mapping, one or more traffic restrictions associated with the traffic flow identifier;
- select a carrier from the plurality of component carriers in accordance with the one or more traffic restrictions associated with the traffic flow identifier; and
- receive the uplink traffic on the selected carrier.

83. The non-transitory computer-readable medium of claim 82, wherein the traffic flow identifier comprises:
- a logical channel identifier (LCID), based on the protocol layer comprising a media access control (MAC) protocol layer; or
- a bearer identifier, based on the protocol layer being above the MAC protocol layer.

* * * * *